US012609788B2

(12) United States Patent
Hao et al.

(10) Patent No.: US 12,609,788 B2
(45) Date of Patent: Apr. 21, 2026

(54) WIRELESS FEEDBACK TECHNIQUES

(71) Applicant: ZTE Corporation, Shenzhen (CN)

(72) Inventors: Peng Hao, Shenzhen (CN); Xing Liu, Shenzhen (CN); Jian Li, Shenzhen (CN); Jing Shi, Shenzhen (CN); Shuaihua Kou, Shenzhen (CN); Wei Gou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 404 days.

(21) Appl. No.: 18/515,963

(22) Filed: Nov. 21, 2023

(65) Prior Publication Data

US 2024/0090044 A1 Mar. 14, 2024

Related U.S. Application Data

(63) Continuation of application No. PCT/CN2021/128546, filed on Nov. 4, 2021.

(51) Int. Cl.
H04L 1/1812 (2023.01)
H04L 5/00 (2006.01)
(Continued)

(52) U.S. Cl.
CPC .......... H04L 1/1812 (2013.01); H04L 5/0053 (2013.01); H04W 74/0833 (2013.01); H04W 74/0866 (2013.01)

(58) Field of Classification Search
CPC .............. H04L 1/1812; H04L 5/0053; H04W 74/0833; H04W 74/0866
See application file for complete search history.

(56) References Cited

U.S. PATENT DOCUMENTS

2019/0274172 A1    9/2019  Yoon et al.
2020/0107358 A1*   4/2020  Basu Mallick ....... H04L 5/0044
(Continued)

FOREIGN PATENT DOCUMENTS

CN      112369104 A    2/2021
CN      113557780 A    10/2021
(Continued)

OTHER PUBLICATIONS

International Search Report and Written Opinion for International Application No. PCT/CN2021/128546, mailed on Aug. 4, 2022 (7 pages).
(Continued)

*Primary Examiner* — Benjamin H Elliott, IV
*Assistant Examiner* — Tracy Lauren Raimondo
(74) *Attorney, Agent, or Firm* — Perkins Coie LLP

(57) ABSTRACT

Techniques are described for performing feedback by a communication device. An example wireless communication method includes receiving, by a communication device, X shared channels from a network device, where the X shared channels are located in between a first random access channel (RACH) instance and a second RACH instance in time domain, where the second RACH instance includes Y RACH occasions in time domain, where X and Y are integers, and where Y is greater than or equal to X; and transmitting, by the communication device, a preamble in at least one RACH occasion from the Y RACH occasions, where the preamble indicates exactly one of: (1) a feedback associated with a shared channel from the X shared channels, or (2) a random access.

20 Claims, 21 Drawing Sheets

Receiving, by a communication device, X shared channels from a network device, wherein the X shared channels are located in between a first random access channel (RACH) instance and a second RACH instance in time domain, wherein the second RACH instance includes Y RACH occasions in time domain, and wherein X and Y are integers — 2102

Transmitting, by the communication device, a preamble in at least one RACH occasion of the Y RACH occasions, wherein the preamble indicates a feedback associated with at least one shared channel from the X shared channels — 2104

Receiving, by the communication device, another response message that includes only an identifier of the preamble or the identifier of the preamble and a timing advance, wherein the preamble is transmitted by the communication device indicating the feedback associated with the at least one shared channel from the X shared channels — 2106

(51)  Int. Cl.
    *H04W 74/08*        (2009.01)
    *H04W 74/0833*     (2024.01)

(56)  References Cited

U.S. PATENT DOCUMENTS

| | | | |
|---|---|---|---|
| 2020/0229157 A1* | 7/2020 | Rastegardoost | .. H04W 74/0833 |
| 2021/0337603 A1 | 10/2021 | Ohta et al. | |
| 2022/0225436 A1 | 7/2022 | Lin et al. | |

FOREIGN PATENT DOCUMENTS

| | | | |
|---|---|---|---|
| JP | 3051734 | A1 | 8/2016 |
| JP | 2020-504514 | A | 2/2020 |
| WO | 2016/184275 | A1 | 11/2016 |
| WO | 2020/148817 | A1 | 7/2020 |
| WO | 2020227094 | A1 | 11/2020 |
| WO | 2022061847 | A1 | 3/2022 |

OTHER PUBLICATIONS

Ericsson, "Remaining details of RACH procedure," 3GPP TSG RAN WG1 #92, Athens, Greece, R1-1802946, Feb. 26-Mar. 2, 2018, 6 pages.
Notice of Allowance for Japanese Patent Application No. 2023-573136, mailed Mar. 7, 2025 (5 pages).
Office Action for Japanese Patent Application No. 2023-573136, mailed Nov. 21, 2024, with English summary (4 pages).
Extended European Search Report for European Patent Application No. 21962851.8, mailed Jun. 7, 2024 (7 pages).

\* cited by examiner

Figure 1:
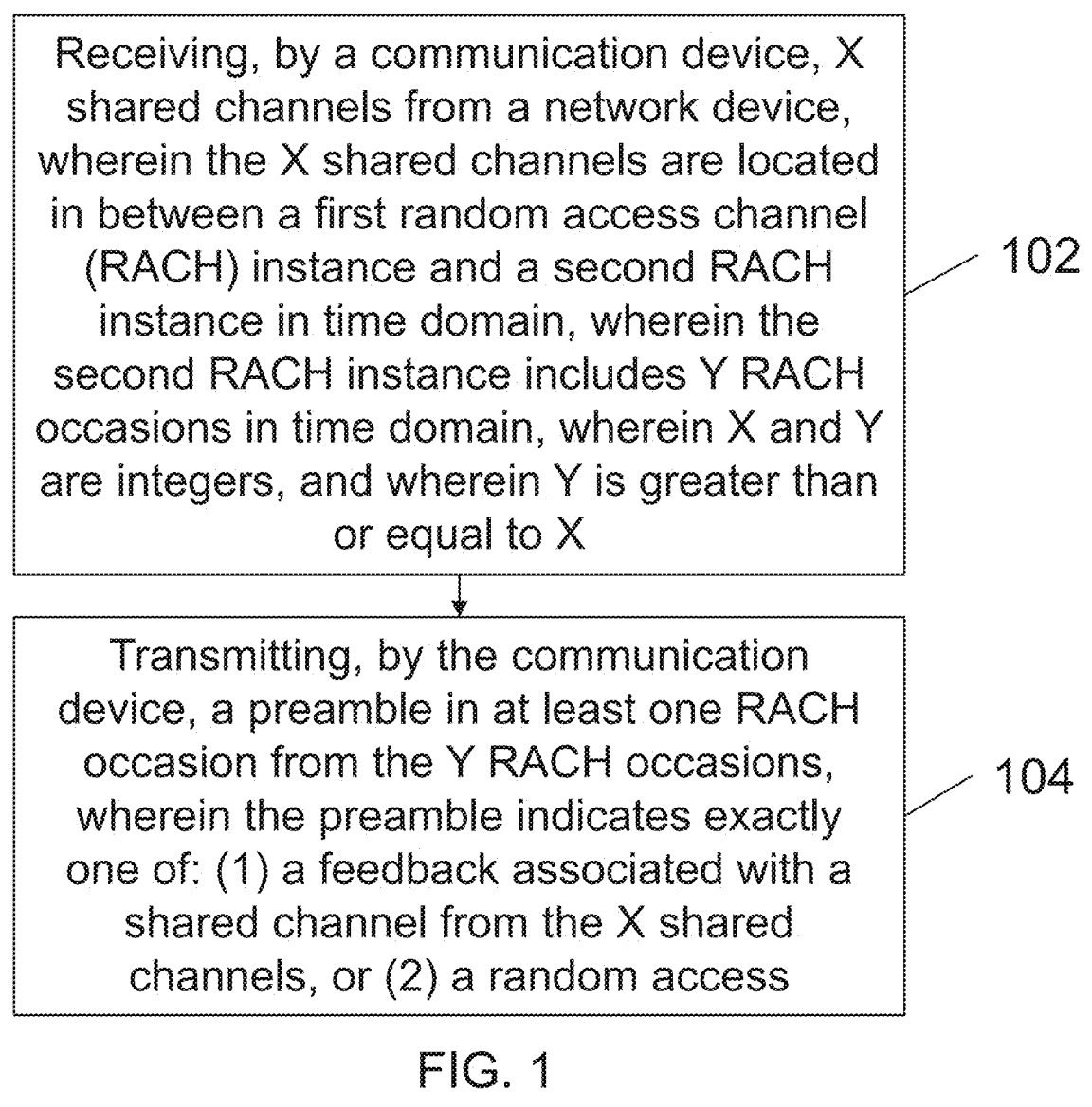

102

Receiving, by a communication device, X shared channels from a network device, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X

104

Transmitting, by the communication device, a preamble in at least one RACH occasion from the Y RACH occasions, wherein the preamble indicates exactly one of: (1) a feedback associated with a shared channel from the X shared channels, or (2) a random access

Memory
1205

Processor(s)
1210

Transmitter
1215

Receiver
1220

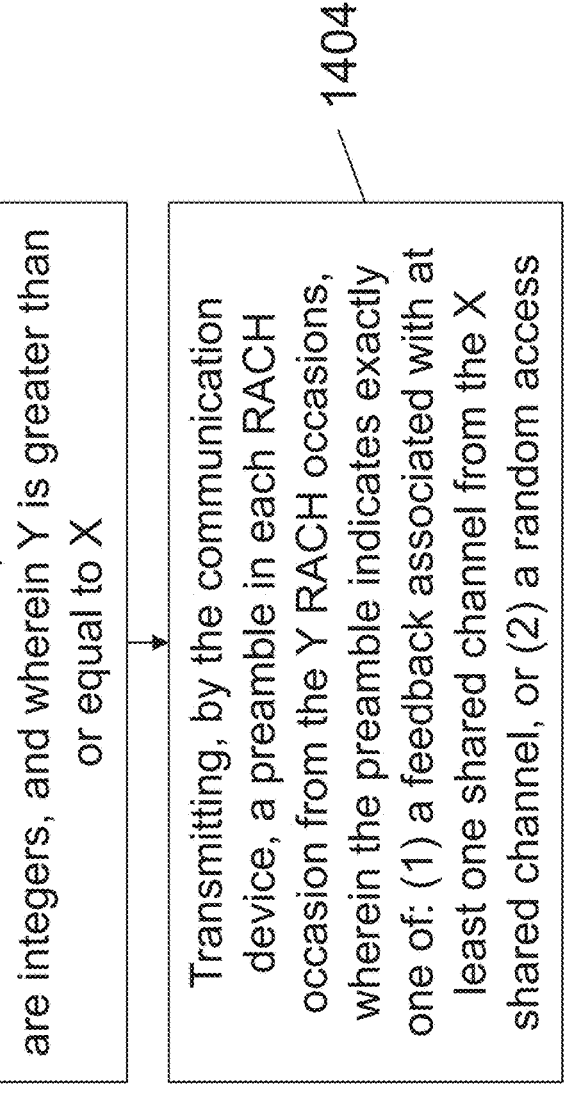

Receiving, by a communication device, X shared channels from a network device, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X

1402

Transmitting, by the communication device, a preamble in each RACH occasion from the Y RACH occasions, wherein the preamble indicates exactly one of: (1) a feedback associated with at least one shared channel from the X shared channel, or (2) a random access

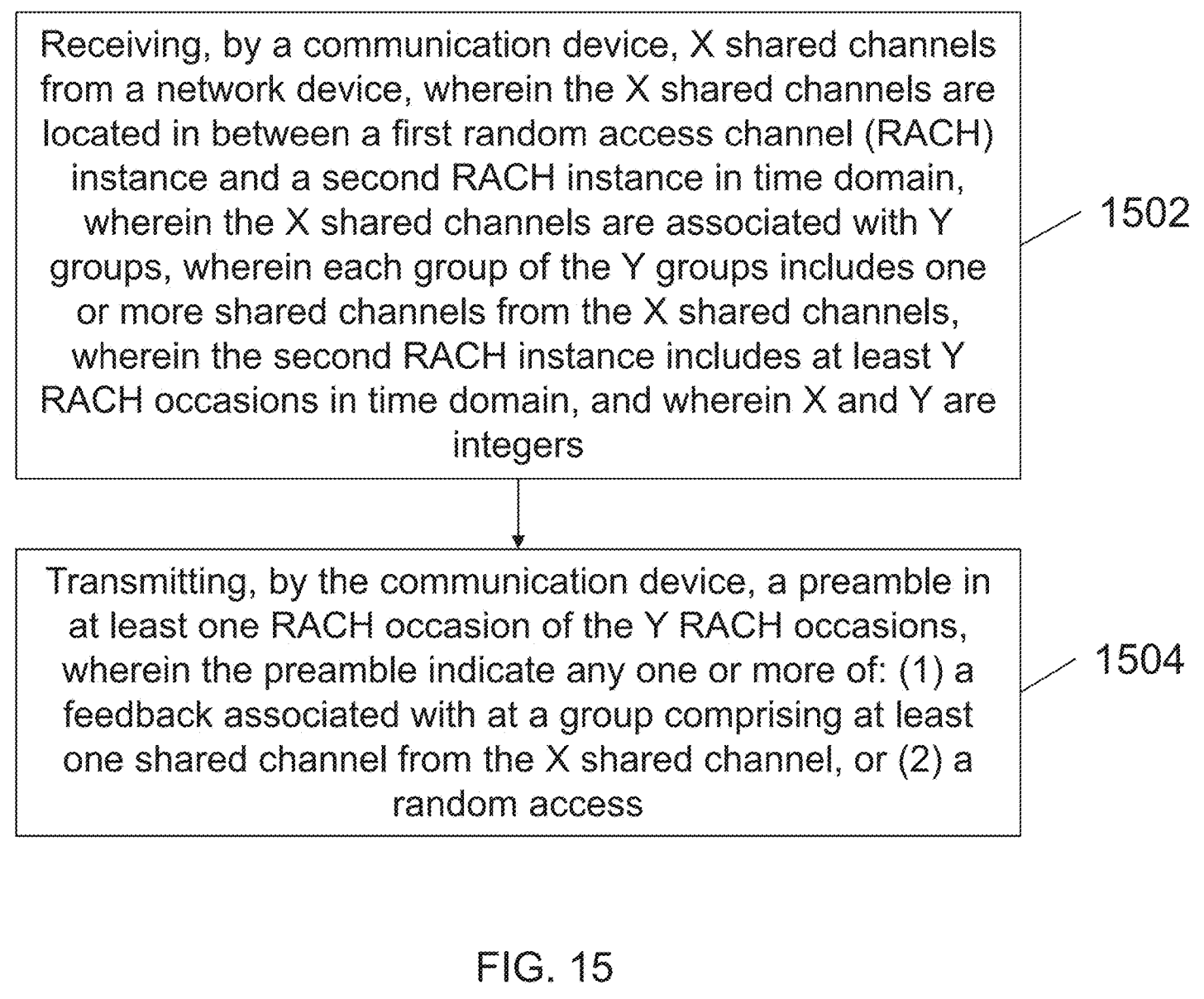

Receiving, by a communication device, X shared channels from a network device, wherein the X shared channels are located in between a first random access channel (RACH) instance and a second RACH instance in time domain, wherein the X shared channels are associated with Y groups, wherein each group of the Y groups includes one or more shared channels from the X shared channels, wherein the second RACH instance includes at least Y RACH occasions in time domain, and wherein X and Y are integers

1504

Transmitting, by the communication device, a preamble in at least one RACH occasion of the Y RACH occasions, wherein the preamble indicate any one or more of: (1) a feedback associated with at a group comprising at least one shared channel from the X shared channel, or (2) a random access

FIG. 15

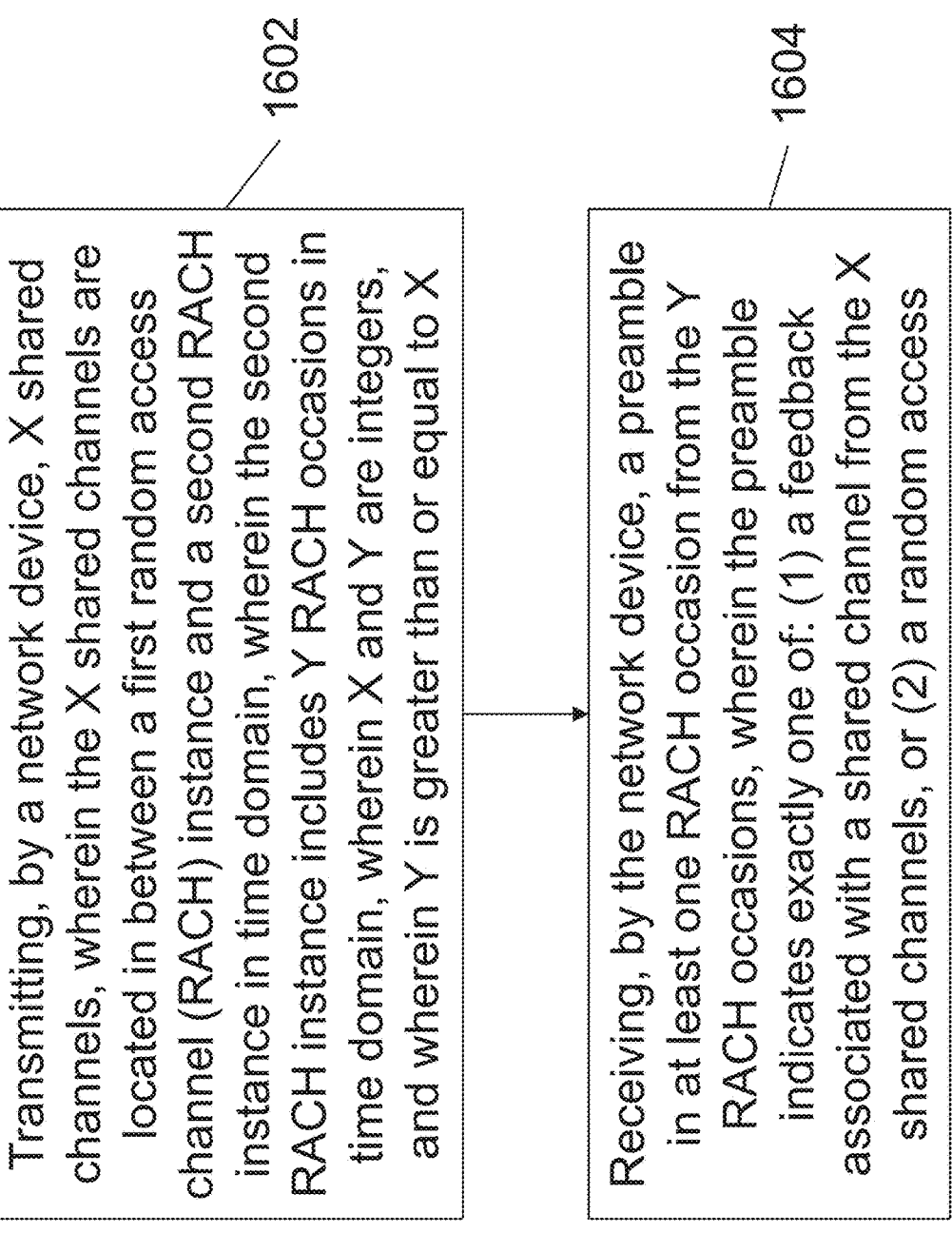

1602

Transmitting, by a network device, X shared channels, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X

1604

Receiving, by the network device, a preamble in at least one RACH occasion from the Y RACH occasions, wherein the preamble indicates exactly one of: (1) a feedback associated with a shared channel from the X shared channels, or (2) a random access

FIG. 16

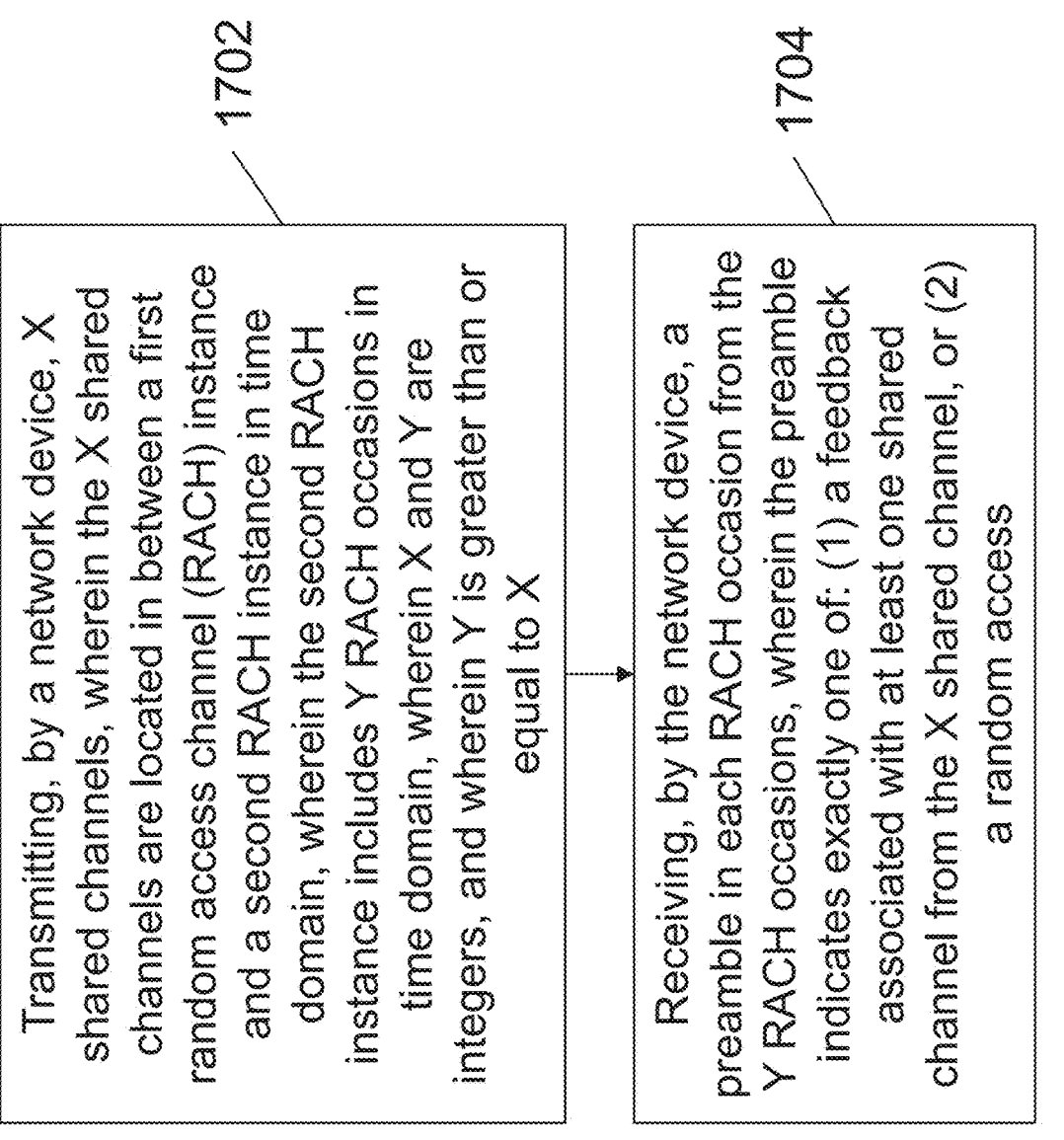

1702

Transmitting, by a network device, X shared channels, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X

1704

Receiving, by the network device, a preamble in each RACH occasion from the Y RACH occasions, wherein the preamble indicates exactly one of: (1) a feedback associated with at least one shared channel from the X shared channel, or (2) a random access

Figure 18:
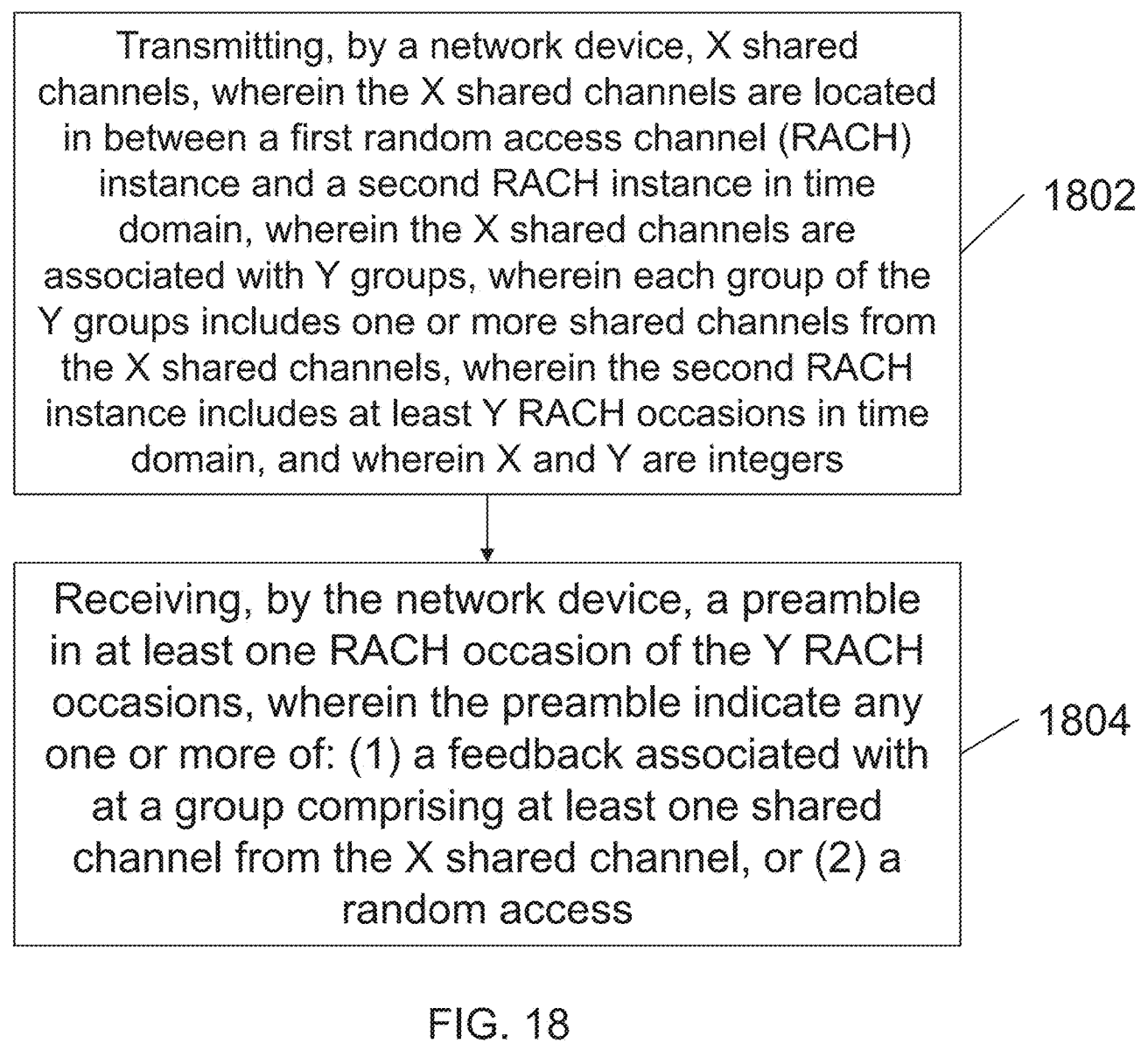

Transmitting, by a network device, X shared channels, wherein the X shared channels are located in between a first random access channel (RACH) instance and a second RACH instance in time domain, wherein the X shared channels are associated with Y groups, wherein each group of the Y groups includes one or more shared channels from the X shared channels, wherein the second RACH instance includes at least Y RACH occasions in time domain, and wherein X and Y are integers

1804

Receiving, by the network device, a preamble in at least one RACH occasion of the Y RACH occasions, wherein the preamble indicate any one or more of: (1) a feedback associated with at a group comprising at least one shared channel from the X shared channel, or (2) a random access

Figure 19:
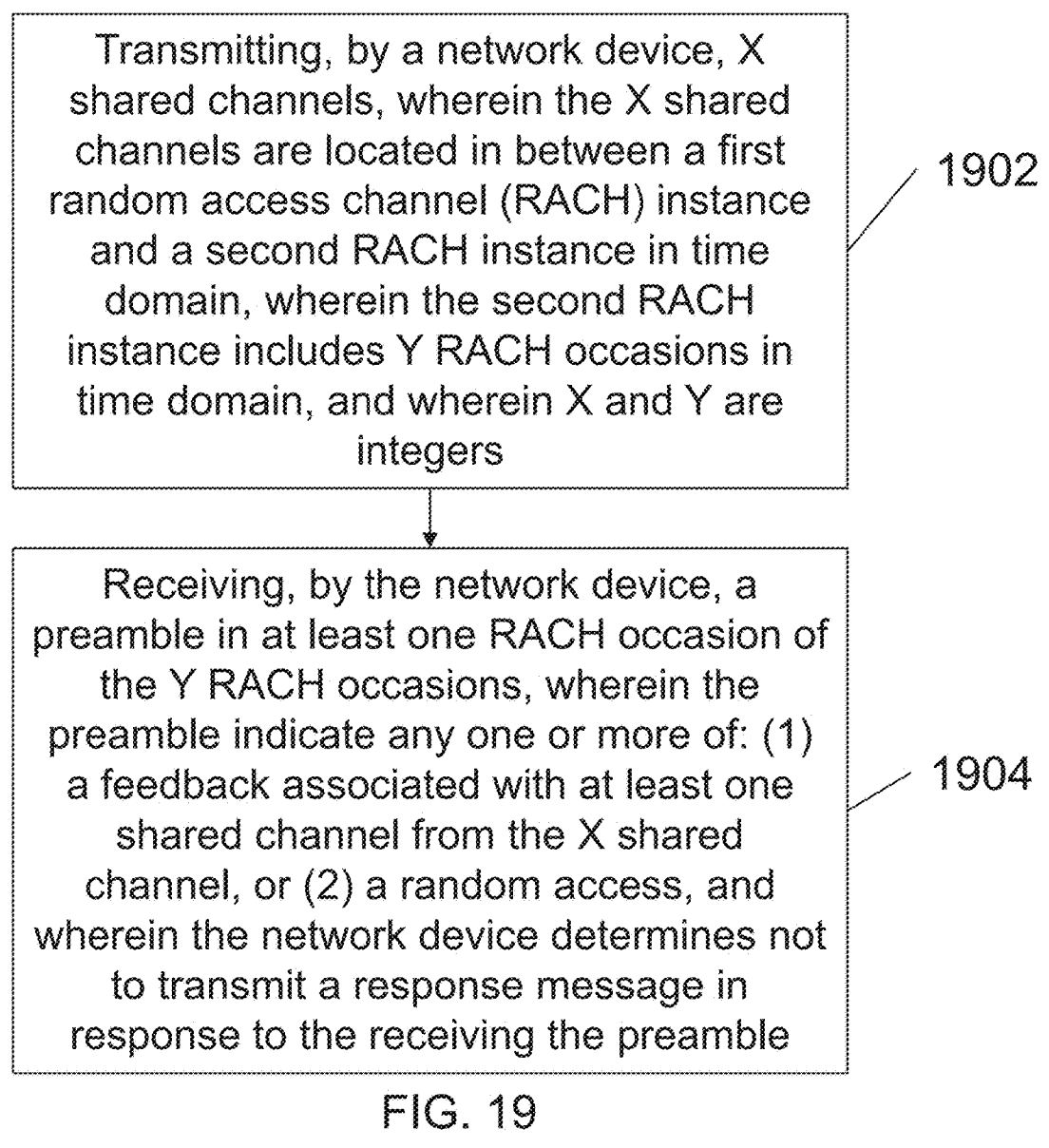

Transmitting, by a network device, X shared channels, wherein the X shared channels are located in between a first random access channel (RACH) instance and a second RACH instance in time domain, wherein the second RACH instance includes Y RACH occasions in time domain, and wherein X and Y are integers

1904

Receiving, by the network device, a preamble in at least one RACH occasion of the Y RACH occasions, wherein the preamble indicate any one or more of: (1) a feedback associated with at least one shared channel from the X shared channel, or (2) a random access, and wherein the network device determines not to transmit a response message in response to the receiving the preamble

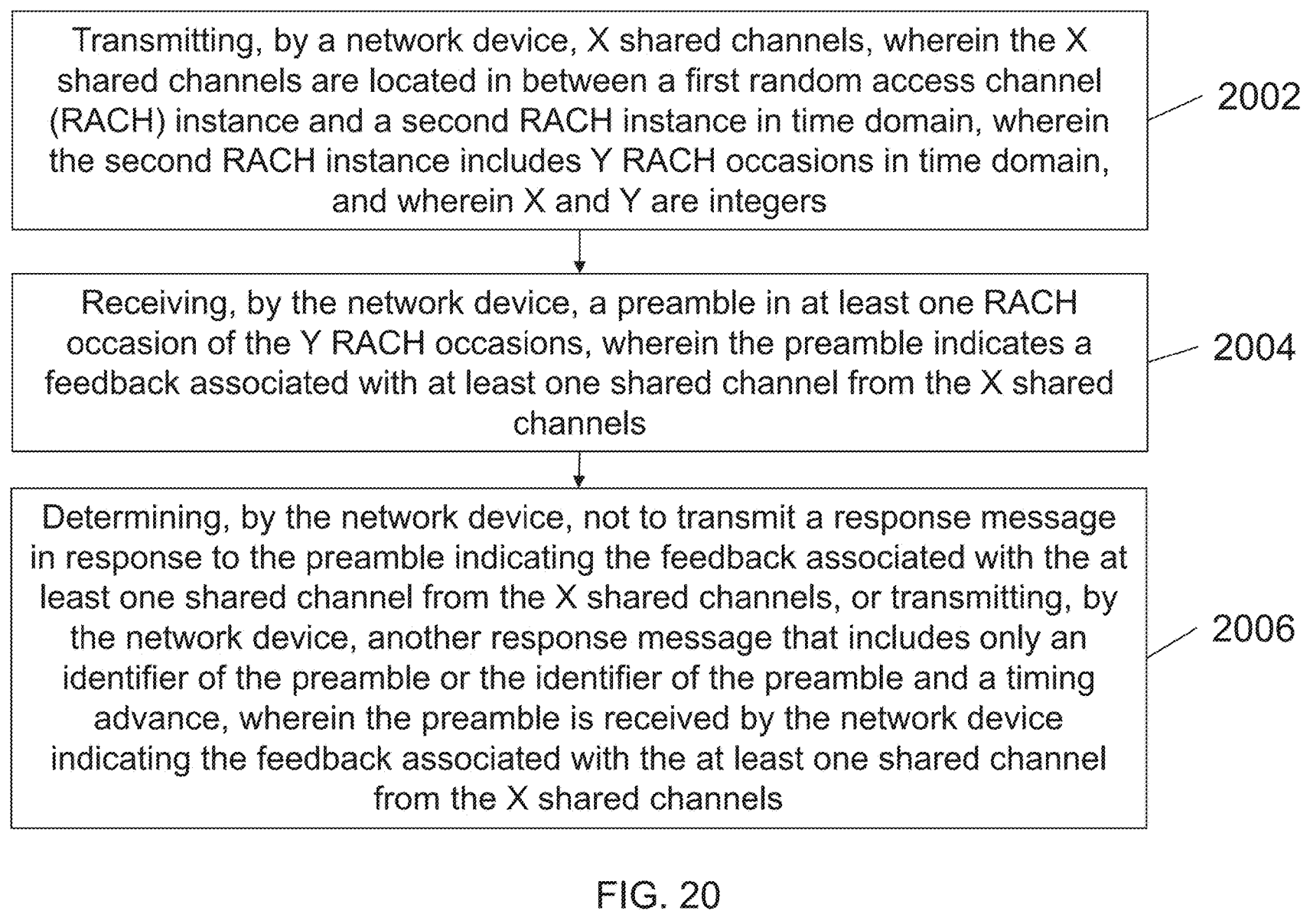

Transmitting, by a network device, X shared channels, wherein the X shared channels are located in between a first random access channel (RACH) instance and a second RACH instance in time domain, wherein the second RACH instance includes Y RACH occasions in time domain, and wherein X and Y are integers

2004

Receiving, by the network device, a preamble in at least one RACH occasion of the Y RACH occasions, wherein the preamble indicates a feedback associated with at least one shared channel from the X shared channels

2006

Determining, by the network device, not to transmit a response message in response to the preamble indicating the feedback associated with the at least one shared channel from the X shared channels, or transmitting, by the network device, another response message that includes only an identifier of the preamble or the identifier of the preamble and a timing advance, wherein the preamble is received by the network device indicating the feedback associated with the at least one shared channel from the X shared channels

FIG. 20

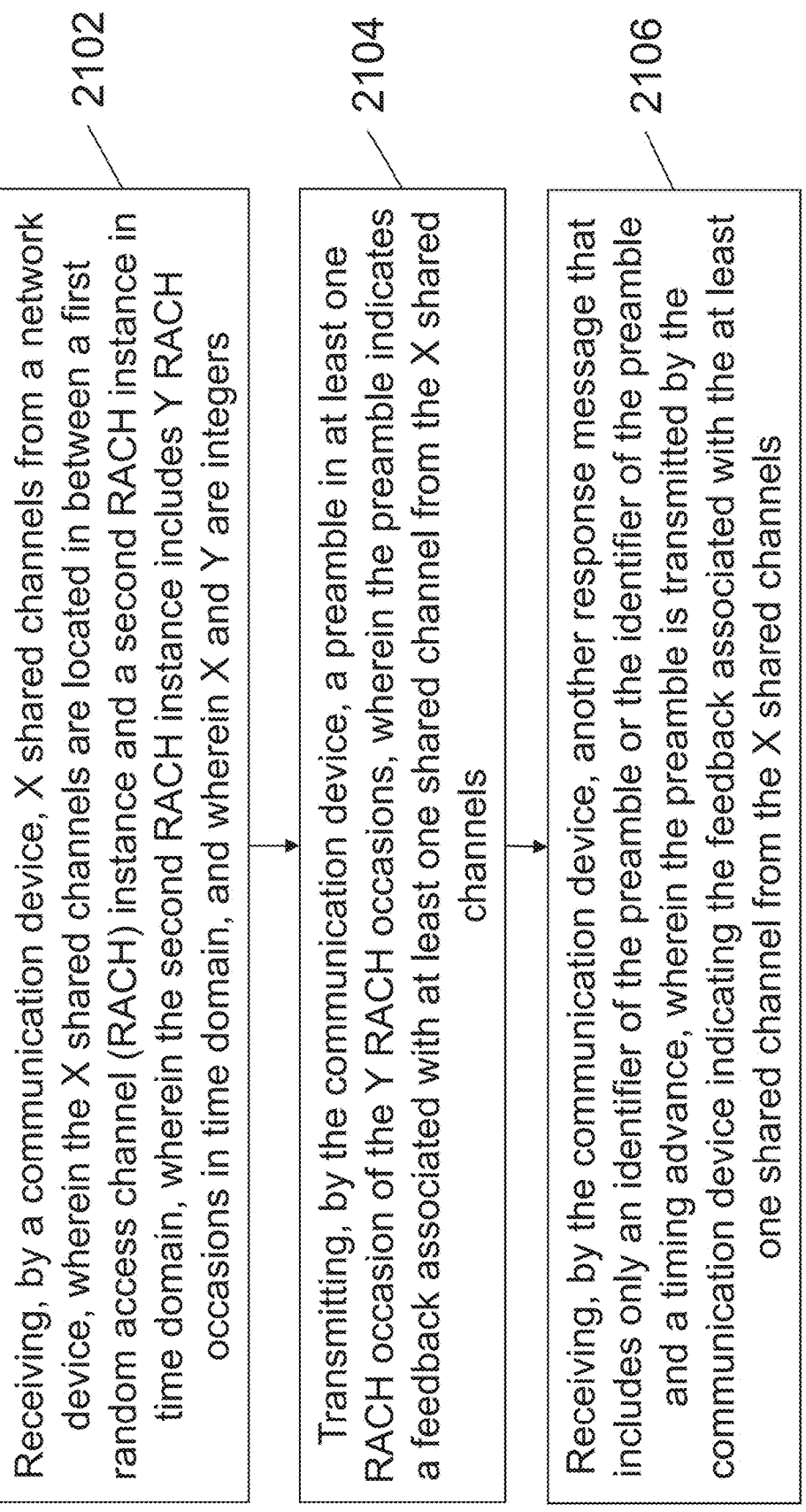

2102

Receiving, by a communication device, X shared channels from a network device, wherein the X shared channels are located in between a first random access channel (RACH) instance and a second RACH instance in time domain, wherein the second RACH instance includes Y RACH occasions in time domain, and wherein X and Y are integers

2104

Transmitting, by the communication device, a preamble in at least one RACH occasion of the Y RACH occasions, wherein the preamble indicates a feedback associated with at least one shared channel from the X shared channels

2106

Receiving, by the communication device, another response message that includes only an identifier of the preamble or the identifier of the preamble and a timing advance, wherein the preamble is transmitted by the communication device indicating the feedback associated with the at least one shared channel from the X shared channels

FIG. 21

WIRELESS FEEDBACK TECHNIQUES

CROSS REFERENCE TO RELATED APPLICATIONS

This patent document is a continuation of and claims benefit of priority to International Patent Application No. PCT/CN2021/128546, filed on Nov. 4, 2021. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for performing wireless feedback by a device in an idle state or in an inactive state. The wireless feedback may include, for example, hybrid automatic repeat request acknowledgement (HARQ-ACK) feedback and/or channel state information (CSI) feedback.

A first example wireless communication method, comprises receiving, by a communication device, X shared channels from a network device, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X; and transmitting, by the communication device, a preamble in at least one RACH occasion from the Y RACH occasions, wherein the preamble indicates exactly one of: (1) a feedback associated with a shared channel from the X shared channels, or (2) a random access.

In some embodiments, in response to Y being greater than X, the Y RACH occasions are associated with X RACH occasion groups, and each of the X RACH occasion groups is associated with one shared channel to be received by the communication device. In some embodiments, in response to Y being greater than X, the Y RACH occasions are associated with X RACH occasion groups, and the X RACH occasion groups are selected from the Y RACH occasions based on a predefined rule. In some embodiments, each of the Y RACH occasions or each of the X RACH occasion groups is associated with a transmission of the preamble for a hybrid automatic repeat request acknowledgment (HARQ-ACK) of one shared channel by the communication device, each of the Y RACH occasions or each of the X RACH occasion groups includes W time domain physical RACH (PRACH) resources, and W is an integer. In some embodiments, each of the Y RACH occasions includes Z physical RACH (PRACH) frequency resources, each of the Z PRACH frequency resources includes a plurality of physical resource blocks, and Z is an integer greater than or equal to 1. In some embodiments, the at least one RACH occasion of the Y RACH occasions includes a transmission of the preamble that only indicates a hybrid automatic repeat request acknowledgment (HARQ-ACK) of the shared channel corresponding to the at least one RACH occasion.

In some embodiments, the at least one RACH occasion of the Y RACH occasions includes a transmission of the preamble from N preambles that indicates a combined non-acknowledgement (NACK) only feedback and random access by the communication device, and N is an integer. In some embodiments, the at least one RACH occasion of the Y RACH occasions includes a transmission of the preamble from M preambles for random access, and M is an integer.

A second wireless communication method, comprises receiving, by a communication device, X shared channels from a network device, wherein the X shared channels are located in between a first random access channel (RACH) instance and a second RACH instance in time wherein X and Y are integers, and wherein Y is greater than or equal to X; and transmitting, by the communication device, a preamble in each RACH occasion from the Y RACH occasions, wherein the preamble indicates exactly one of: (1) a feedback associated with at least one shared channel from the X shared channel, or (2) a random access.

In some embodiments, each of the Y RACH occasions is associated with a transmission of a hybrid automatic repeat request acknowledgment (HARQ-ACK) of the at least one shared channel from the X shared channels by the communication device, each of the Y RACH occasions includes W time domain physical RACH (PRACH) resources, and W is an integer. In some embodiments, each RACH occasion of the Y RACH occasions the preamble from $2^X$ preambles or $2^X-1$ preambles that only indicate a hybrid automatic repeat request acknowledgment (HARQ-ACK) of the at least one shared channel from the X shared channels. In some embodiments, each RACH occasion of the Y RACH occasions includes the preamble from $(2^X)*N$ preambles or $(2^X-1)*N$ preambles that indicate a combined non-acknowledgement (NACK) only feedback and random access, and N is an integer. In some embodiments, each RACH occasion of the Y RACH occasions includes the preamble from M preambles that indicate random access, and M is an integer.

A third wireless communication method, comprises receiving, by a communication device, X shared channels from a network device, wherein the X shared channels are located in between a first random access channel (RACH) instance and a second RACH instance in time domain, wherein the X shared channels are associated with Y groups, wherein each group of the Y groups includes one or more shared channels from the X shared channels, wherein the second RACH instance includes at least Y RACH occasions in time domain, and wherein X and Y are integers; and transmitting, by the communication device, a preamble in at least one RACH occasion of the Y RACH occasions, wherein the preamble indicate any one or more of: (1) a feedback associated with at a group comprising at least one shared channel from the X shared channel, or (2) a random access.

In some embodiments, the at least one RACH occasion is associated with a transmission of the preamble that is associated with a hybrid automatic repeat request acknowledgment (HARQ-ACK) of the group comprising the at least one shared channel, the at least one RACH occasion includes W time domain physical RACH (PRACH) resources, and W is an integer. In some embodiments, the at least one RACH occasion of the Y RACH occasions includes a transmission of the preamble from $2^{(X/Y)}$ preambles or $2^X-1$ preambles that only indicate a hybrid automatic repeat request acknowledgment (HARQ-ACK) of the at least one shared channel. In some embodiments, the at least one RACH occasion of the Y RACH occasions includes a transmission of the preamble from $(2^X)*N$ preambles or $(2^X-1)*N$ preambles that indicate a combined non-acknowledgement (NACK) only feedback and random access, and N is an integer. In some embodiments, the at least one RACH occasion of the Y RACH occasions includes a transmission of the preamble from M preambles for random access, and M is an integer. In some embodiments, the communication device is operating in a low power state that includes an idle state or an inactive state.

A fourth wireless communication method, comprises transmitting, by a network device, X shared channels, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X; and receiving, by the network device, a preamble in at least one RACH occasion from the Y RACH occasions, wherein the preamble indicates exactly one of: (1) a feedback associated with a shared channel from the X shared channels, or (2) a random access.

In some embodiments, in response to Y being greater than X, the Y RACH occasions are associated with X RACH occasion groups, and each of the X RACH occasion groups is associated with one shared channel to be transmitted by the network device. In some embodiments, in response to Y being greater than X, the Y RACH occasions are associated with X RACH occasion groups, and the X RACH occasion groups are from the Y RACH occasions based on a predefined rule. In some embodiments, each of the Y RACH occasions or each of the X RACH occasion groups is associated with a reception of the preamble for a hybrid automatic repeat request acknowledgment (HARQ-ACK) of one shared channel by the network device, each of the Y RACH occasions or each of the X RACH occasion groups includes W time domain physical RACH (PRACH) resources, and W is an integer. In some embodiments, each of the Y RACH occasions includes Z physical RACH (PRACH) frequency resources, each of the Z PRACH frequency resources includes a plurality of physical resource blocks, and Z is an integer greater than or equal to 1. In some embodiments, the at least one RACH occasion of the Y RACH occasions includes a reception of the preamble that only indicates a hybrid automatic repeat request acknowledgment (HARQ-ACK) of the shared channel corresponding to the at least one RACH occasion. In some embodiments, the at least one RACH occasion of the Y RACH occasions includes a reception of the preamble from N preambles that indicates a combined non-acknowledgement (NACK) only feedback and random access by the network device, and N is an integer.

In some embodiments, the at least one RACH occasion of the Y RACH occasions includes a reception of the preamble from M preambles for random access, and M is an integer.

A fifth wireless communication method, comprises transmitting, by a network device, X shared channels, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X; and receiving, by the network device, a preamble in each RACH occasion from the Y RACH occasions, wherein the preamble indicates exactly one of: (1) a feedback associated with at least one shared channel from the X shared channel, or (2) a random access.

In some embodiments, each of the Y RACH occasions is associated with a reception of a hybrid automatic repeat request acknowledgment (HARQ-ACK) of the at least one shared channel from the X shared channels by the network device, each of the Y RACH occasions includes W time domain physical RACH (PRACH) resources, and W is an integer. In some embodiments, each RACH occasion of the Y RACH occasions the preamble from $2^X$ preambles or $2^X-1$ preambles that only indicate a hybrid automatic repeat request acknowledgment (HARQ-ACK) of the at least one shared channel from the X shared channels. In some embodiments, each RACH occasion of the Y RACH occasions includes the preamble from $(2^X)*N$ preambles or $(2^X-1)*N$ preambles that indicate a combined non-acknowledgement (NACK) only feedback and random access, and N is an integer. In some embodiments, each RACH occasion of the Y RACH occasions includes the preamble from M preambles that indicate random access, and M is an integer.

A sixth wireless communication method, comprises transmitting, by a network device, X shared channels, wherein the X shared channels are located in between a first random access channel (RACH) instance and a second RACH instance in time domain, wherein the X shared channels are associated with Y groups, wherein each group of the Y groups includes one or more shared channels from the X shared channels, wherein the second RACH instance includes at least Y RACH occasions in time domain, and wherein X and Y are integers; and receiving, by the network device, a preamble in at least one RACH occasion of the Y RACH occasions, wherein the preamble indicate any one or more of: (1) a feedback associated with at a group comprising at least one shared channel from the X shared channel, or (2) a random access.

In some embodiments, the at least one RACH occasion is associated with a reception of the preamble that is associated with a hybrid automatic repeat request acknowledgment (HARQ-ACK) of the group comprising the at least one shared channel, the at least one RACH occasion includes W time domain physical RACH (PRACH) resources, and W is an integer. In some embodiments, the at least one RACH occasion of the Y RACH occasions includes a reception of the preamble from $2^{(X/Y)}$ preambles or $2^X-1$ preambles that only indicate a hybrid automatic repeat request acknowledgment (HARQ-ACK) of the at least one shared channel. In some embodiments, the at least one RACH occasion of the Y RACH occasions includes a reception of the preamble from $(2^X)*N$ preambles or $(2^X-1)*N$ preambles that indicate a combined non-acknowledgement (NACK) only feedback and random access, and N is an integer. In some embodiments, the at least one RACH occasion of the Y RACH occasions includes a reception of the preamble from M preambles for random access, and M is an integer.

A seventh wireless communication method, comprises transmitting, by a network device, X shared channels, wherein the X shared channels are located in between a first random access channel (RACH) instance and a second RACH instance in time domain, wherein the second RACH instance includes Y RACH occasions in time domain, and wherein X and Y are integers; and receiving, by the network device, a preamble in at least one RACH occasion of the Y RACH occasions, wherein the preamble indicate any one or more of: (1) a feedback associated with at least one shared channel from the X shared channel, or (2) a random access, and wherein the network device determines not to transmit a response message in response to the receiving the preamble.

An eighth wireless communication method, comprises transmitting, by a network device, X shared channels, wherein the X shared channels are located in between a first random access channel (RACH) instance and a second RACH instance in time domain, wherein the second RACH instance includes Y RACH occasions in time domain, and wherein X and Y are integers; receiving, by the network device, a preamble in at least one RACH occasion of the Y RACH occasions, wherein the preamble indicates a feedback associated with at least one shared channel from the X shared channels; and determining, by the network device, not to transmit a response message in response to the preamble indicating the feedback associated with the at least one shared channel from the X shared channels, or transmitting, by the network device, another response message that includes only an identifier of the preamble or the identifier of the preamble and a timing advance, wherein the preamble is received by the network device indicating the feedback associated with the at least one shared channel from the X shared channels.

In some embodiments, the network device terminates a random access process after the transmitting the another response message. In some embodiments, the method further comprises receiving, by the network device, another preamble with higher power in response to the another response message that is not received by a communication device. In some embodiments, the another preamble indicates the feedback associated with the at least one shared channel located in between a third random access channel (RACH) instance and a forth RACH instance in time domain, or the another preamble is a retransmission of the preamble indicating the feedback associated with the at least one shared channel from the X shared channels In some embodiments, the method further comprises receiving, by the network device and prior to the transmitting the another response message, another preamble for the random access in another RACH occasion of the Y RACH occasion, wherein the transmitting the another response message is in response to the receiving of the preamble and the receiving of the another preamble, where the preamble and the another preamble indicate the feedback associated with the at least one shared channel from the X shared channels.

A ninth wireless communication method, comprises receiving, by a communication device, X shared channels from a network device, wherein the X shared channels are located in between a first random access channel (RACH) instance and a second RACH instance in time domain, wherein the second RACH instance includes Y RACH occasions in time domain, and wherein X and Y are integers; transmitting, by the communication device, a preamble in at least one RACH occasion of the Y RACH occasions, wherein the preamble indicates a feedback associated with at least one shared channel from the X shared channels; and receiving, by the communication device, another response message that includes only an identifier of the preamble or the identifier of the preamble and a timing advance, wherein the preamble is transmitted by the communication device indicating the feedback associated with the at least one shared channel from the X shared channels.

In some embodiments, the method further comprises transmitting, by the communication device, another preamble with higher power in response to the another response message that is not received by the communication device. In some embodiments, the another preamble indicates the feedback associated with the at least one shared channel located in between a third random access channel (RACH) instance and a forth RACH instance in time domain, or the another preamble is a retransmission of the preamble indicating the feedback associated with the at least one shared channel from the X shared channels. In some embodiments, the method further comprises transmitting, by the communication device and prior to the receiving the another response message, another preamble for the random access in another RACH occasion of the Y RACH occasion, wherein the receiving the another response message is in response to the transmitting of the preamble and the transmitting of the another preamble, where the preamble and the another preamble indicate the feedback associated with the at least one shared channel from the X shared channels. In some embodiments, the network device includes a base station.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 1 shows an exemplary flowchart for performing a transmission of a preamble by a communication device.

FIGS. 14-15 show additional exemplary flowcharts for performing a transmission of a preamble by a communication device.

FIGS. 16-20 shows exemplary flowcharts for receiving a preamble by a network device.

FIG. 21 show an additional exemplary flowchart for performing a transmission of a preamble by a communication device.

DETAILED DESCRIPTION

Release-17 (R17) of new radio (NR) multi-cast and broadcast service (MBS) focuses on radio resource control (RRC) connected state, but only basic MBS function is supported for UE in RRC_IDLE/RRC INACTIVE states. Introduction to RRC states including RRC_IDLE/RRC INACTIVE/connected is described in current wireless technology. MBS in idle or inactive state has attracted attention from many verticals, which can enable one UE to receive broadcast service from MBS operator's network no matter which operator the UE belongs to. One motivation behind this is to make money by selling ads, which expects as many viewers as possible. This is a different operation model from conventional telecommunication carriers. Another motivation is that MBS operators may have responsibility to broadcast some non-profit TV programs, which are targeted to all audience.

Wireless feedback (including HARQ-ACK and/or CSI) for multicast service in RRC connected state is supported in R17 via PUCCH or PUSCH. Meanwhile performance gain of feedback for broadcast or multicast in RRC idle/inactive state has been observed. But how to realize feedback in RRC idle/inactive state is still an uncharted territory at least because the UE may not obtain time/frequency resources for performing a feedback in RRC idle/inactive state. This patent document provides several techniques that may be based on 4-step random access related channels and procedure to solve at least the above described technical problem. The example techniques described in this patent document can enable feedback including HARQ-ACK and/or CSI feedback in RRC_IDLE or RRC_INACTIVE. The performance of MBS in RRC_IDLE or RRC_INACTIVE can be improved when the proposed techniques are applied. Meanwhile, the proposed techniques can save overhead as much as possible and achieve a good tradeoff between resource consumption and performance.

Figure 2:
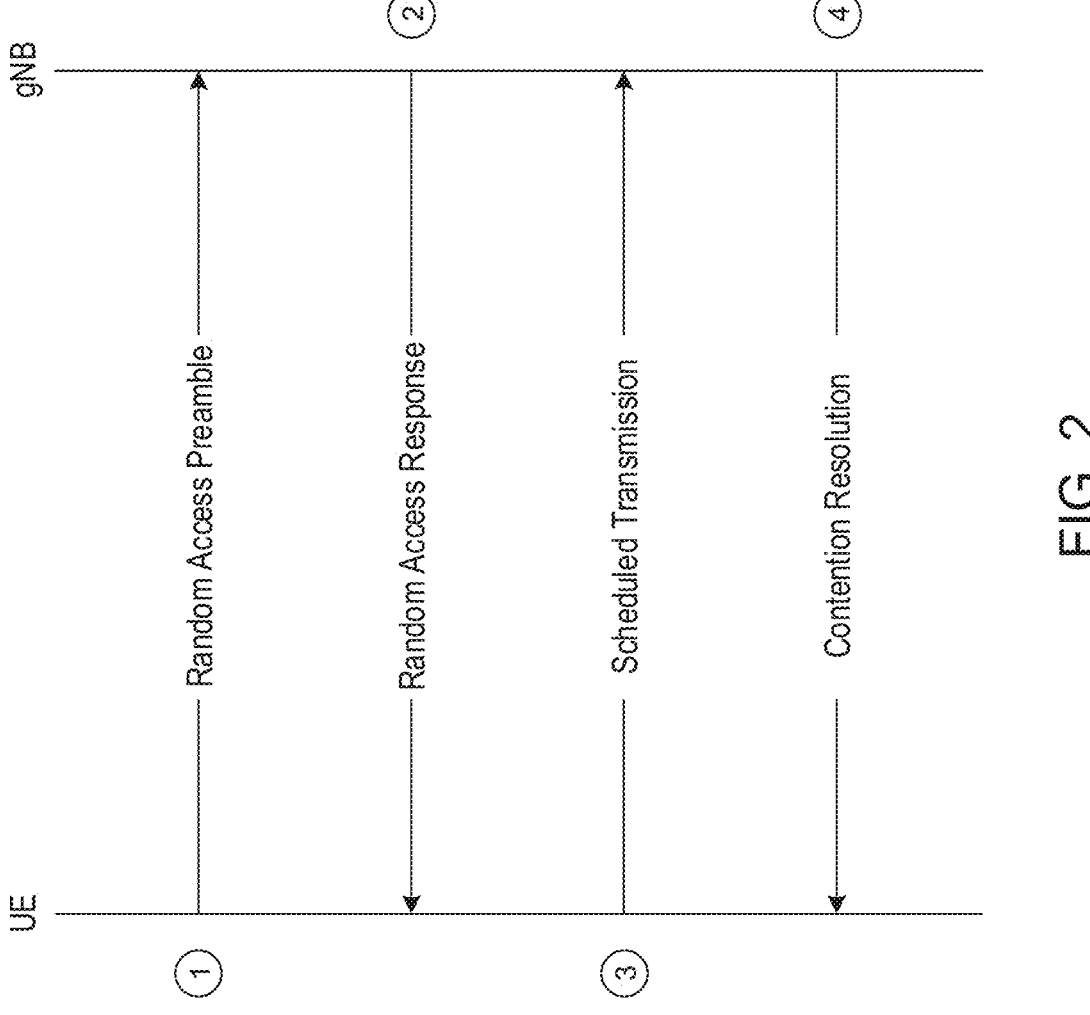
FIG. 2 shows an example contention based random access technique or random access process with four-step

The procedure of contention based random access (CBRA) with 4-step is shown in FIG. 2 where random access preamble, random access response (RAR), scheduled transmission and contention resolution can also be called msg1, msg2, msg3 and msg4, respectively. The MSG1 of the 4-step RA type includes a preamble on a physical random access channel (PRACH). After MSG1 transmission, the UE monitors for a response from the network (e.g., gNB) within a configured window. For CBRA, upon reception of the random access response, the UE sends MSG3 using the uplink (UL) grant scheduled in the response and monitors contention resolution as shown in FIG. 2. If contention resolution is not successful after MSG3 (re)transmission(s), the UE goes back to MSG1 transmission. In some implementations, the techniques described in Embodiments 1 to 6 in this patent document may include transmitting the preamble for HARQ-ACK feedback and/or the preamble for random access and/or preamble for CSI feedback in msg1. In some implementations, the techniques described in Embodiment 7 in this patent document may include transmitting the preamble for HARQ-ACK feedback and/or the preamble for CSI feedback in msg3.

Figure 3:
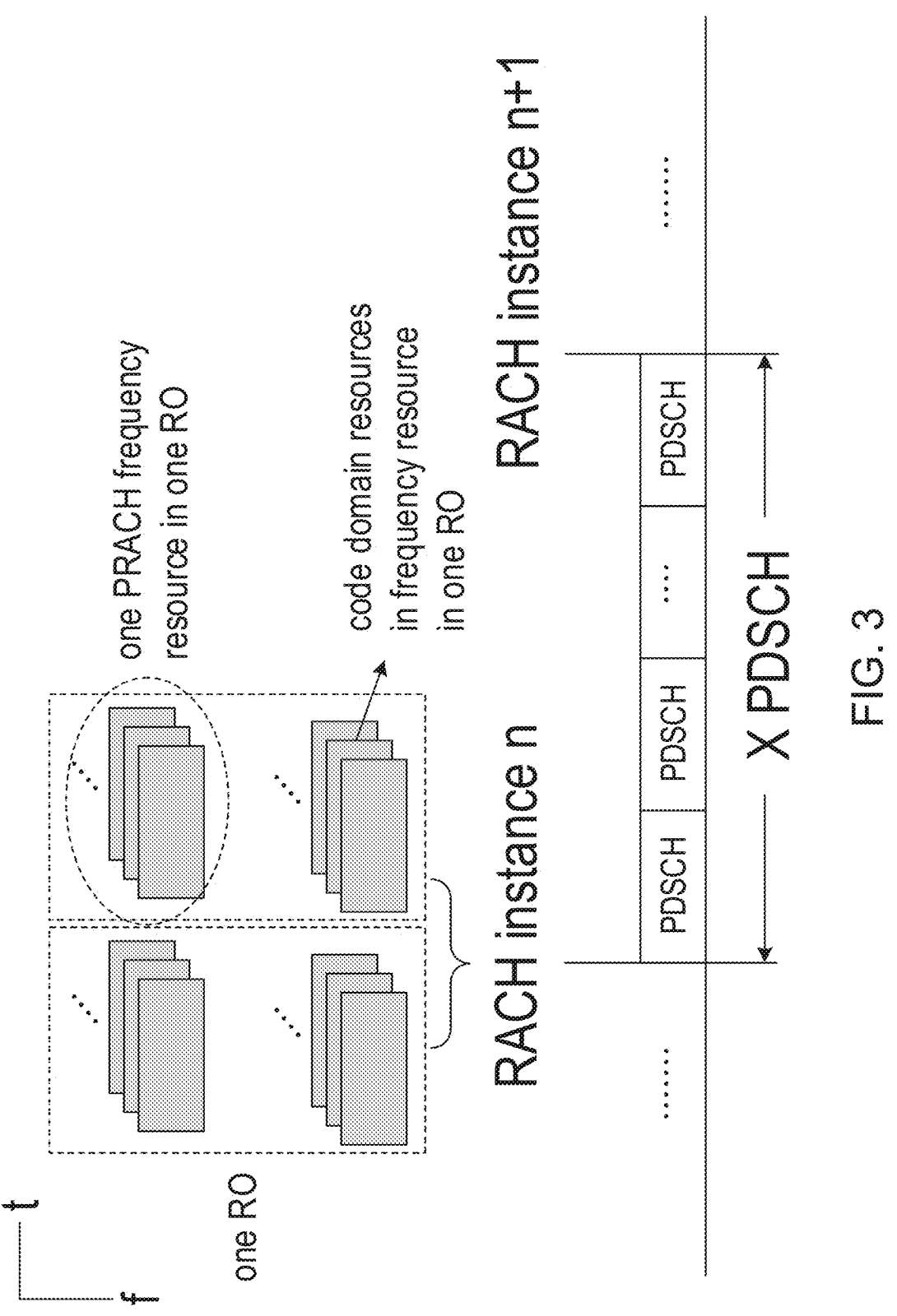
FIG. 3 shows an illustration of random access channel (RACH) resources.

The random access channel (RACH) resources can be allocated periodically. It is assumed there are X MBS physical downlink shared channel (PDSCH) or physical downlink control channel (PDCCH) monitoring occasions (e.g., PDCCH MO) between two adjacent RACH instances, where X is an integer. One RACH instance may include one or multiple PRACH occasions (ROs) and each RO consists of one or multiple RACH time domain resources. There may be one or multiple frequency domain resources in one RO. Furthermore, there will be multiple code domain resources (e.g., preambles) in frequency domain resource in one RO as shown in FIG. 3.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Embodiment 1

Figure 4:
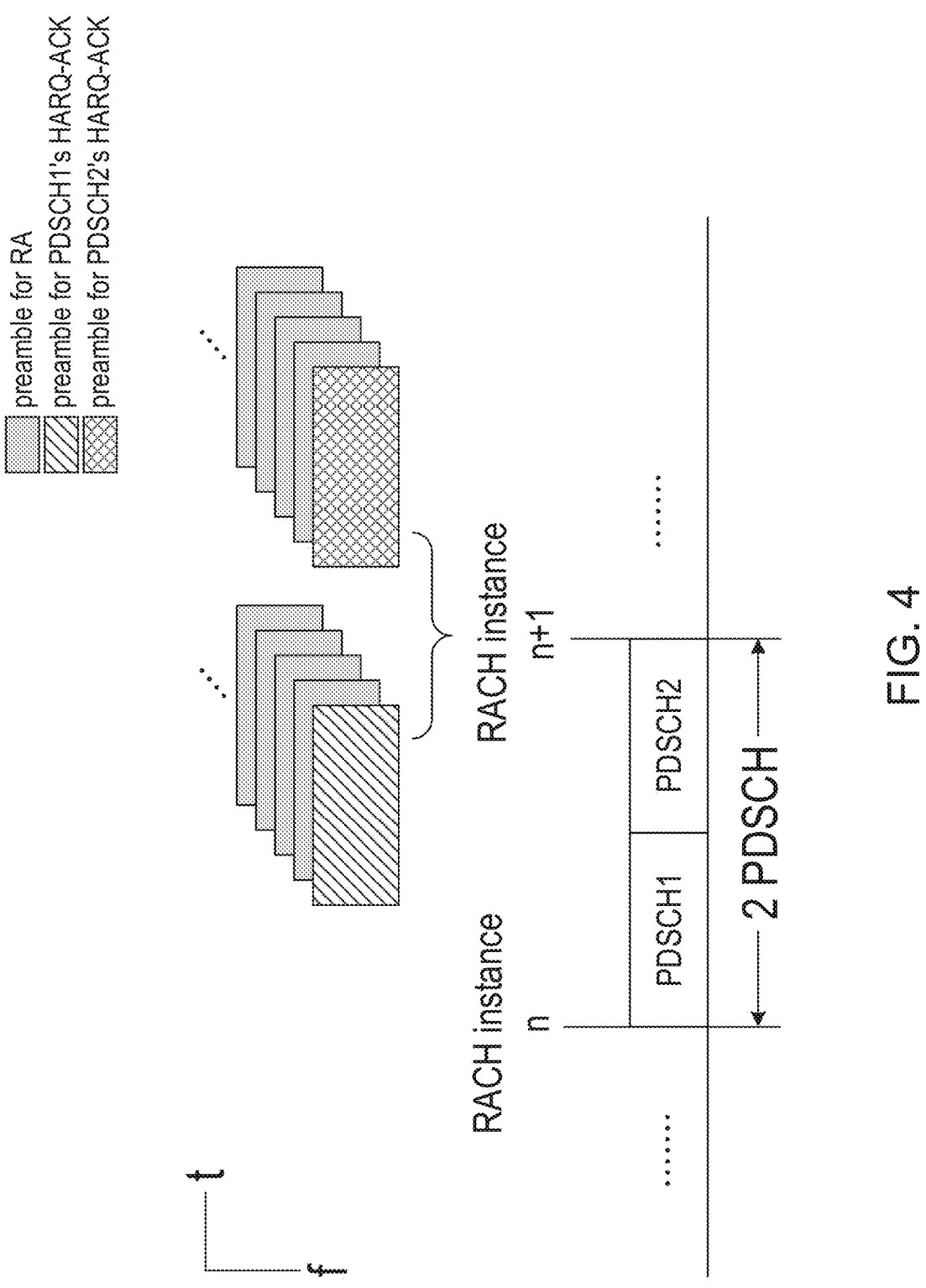
FIG. 4 shows an example hybrid automatic repeat request acknowledgement (HARQ-ACK) feedback with separate coding.

As shown in FIG. 4 (assuming X=2), Embodiment 1 features HARQ-ACK feedback with separate coding and meanwhile either random access or HARQ-ACK feedback is performed (e.g., not at the same time). The HARQ-ACK refers to non-acknowledgement (NACK) feedback or NACK/discontinuous transmission (DTX) feedback.

For NACK feedback, UE performs feedback only when PDSCH detection fails. For NACK/DTX feedback, UE will perform feedback when either PDSCH detection fails or DTX happens. DTX here may mean that no PDCCH for PDSCH scheduling is detected by the UE. The shortcoming of NACK-only manner is that DTX can't be identified by gNB as UE will not perform feedback either PDSCH is successfully detected or DTX happens.

As separate coding is applied, the HARQ-ACK feedback resources for different PDSCHs between two adjacent RACH instances should be allocated in different ROs as NACK/DTX may occurs for two or more PDSCHs and transmission of more than one preamble in one RO is prohibited due to single carrier restriction in uplink. Therefore, we may need X ROs in one RACH instance and HARQ-ACK feedback resource for one PDSCH is allocated in one RO. The preamble used for HARQ-ACK feedback (or HARQ-ACK preamble, e.g., the two boxes that include hatch patterns in FIG. 4) cannot be used for random access and other preambles are dedicated to random access (or RA preambles, solid rectangles in FIG. 4). The preamble for HARQ-ACK feedback will be sent by UE to indicate that NACK/DTX of corresponding PDSCH occurs. The total number of preambles for HARQ-ACK feedback in a time instance may be X.

Thus, for example if X=2 and if RO=2 and if the UE determines that PDSCH1 and PDSCH2 are both incorrectly decoded, then the UE may transmit a first preamble in a first RO associated with PDSCH1's HARQ-ACK (which indicates NACK to the gNB for PDSCH1), and the UE may transmit a second preamble in the second RO associated with PDSCH2's HARQ-ACK (which indicates NACK to the gNB for PDSCH2). In this example for Embodiment 1, the UE is unable to transmit preambles for random access in the first RO or the second RO. In another example if X=2 and if RO=2 and if the UE determines that PDSCH1 has been correctly decoded and PDSCH2 is incorrectly decoded, and if the UE wants to transmit a preamble for random access, then the UE may transmit a first preamble in a first RO for the random access and the UE may transmit a second preamble in the second RO associated with PDSCH2's HARQ-ACK (which indicates NACK to the gNB for PDSCH2). In this example for Embodiment 1, the UE is unable to transmit a preamble for random access in the second RO.

UE will randomly select one RA preamble in the ROs for which the corresponding PDSCHs are correctly decoded.

When the number of ROs in one RACH instance is more than the number of PDSCHs between two adjacent PDSCHs, we can divide these ROs into X groups and one RO group (instead of one RO) corresponds to one PDSCH. Or X ROs among all ROs can be configured or selected according to predefined rule (e.g., a first X ROs out of all ROs can be selected). In some embodiments, each group can correspond to one PDSCH. In some embodiments, each RO in a certain group corresponds to one PDSCH. For example, assuming Y=4, X=2. we can have two RO groups. In a first implementation for this example, PDSCH1 can be associated with RO1 in group 1, and PDSCH2 can be associated with RO2 in group1. In a second implementation for this example, PDSCH1 can be associated with group1 and PDSCH2 can be associated with group2. In the second implementation, the technique to select RO in one group for the PDSCH mapped to that group can be based on a predefined rule.

There could be one RAR (e.g., msg2) for each HARQ-ACK preamble to confirm the reception of HARQ-ACK preamble, which may be useful in the sense of power ramp-up of its next transmission, e.g., when RAR is not received for the HARQ-ACK preamble, power ramp-up can be done for its next transmission (the retransmission of the HARQ-ACK preamble for the same PDSCH or the transmission of the HARQ-ACK preamble for different PDSCHs). Only RA-preamble identifier or RA-preamble identifier and TA (timing advance) is needed in RAR. UL GRANT for msg3 and temporary C-RNTI are not needed as msg3 and msg4 will be absent. One RAR for one HARQ-ACK preamble may consume some resource(s). One enhancement is to send one RAR for all HARQ-ACK preambles in different ROs and there can be indication in the RAR on whether the HARQ-ACK preambles are received. The RAR is addressed to RA-RNTI, so when one RAR includes the information of multiple HARQ-ACK preamble, the RA-RANTI is calculated with the information of multiple HARQ-ACK preamble.

There could be a pre-defined rule for RAR transmission to reduce the overhead, e.g., only the HARQ-ACK in some ROs will have corresponding RAR.

Embodiment 1 may be associated with at least two features. First, when all PDSCHs between two RACH instances are not correctly decoded, HARQ-ACK feedback and random access cannot be done at the same time, which will prolong the random access time if HARQ-ACK feedback is prioritized or degrade MBS PDSCH transmission performance if HARQ-ACK is dropped. It is noted that this may not a big problem as the probability of all PDSCHs failure will be low especially when there is large amount of PDSCHs. Second, the number of ROs has to be equal to or larger than the number of PDSCHs between two adjacent RACH instances, which may impose unnecessary RO configuration restriction when RA load is low.

II. Embodiment 2

Figure 5:
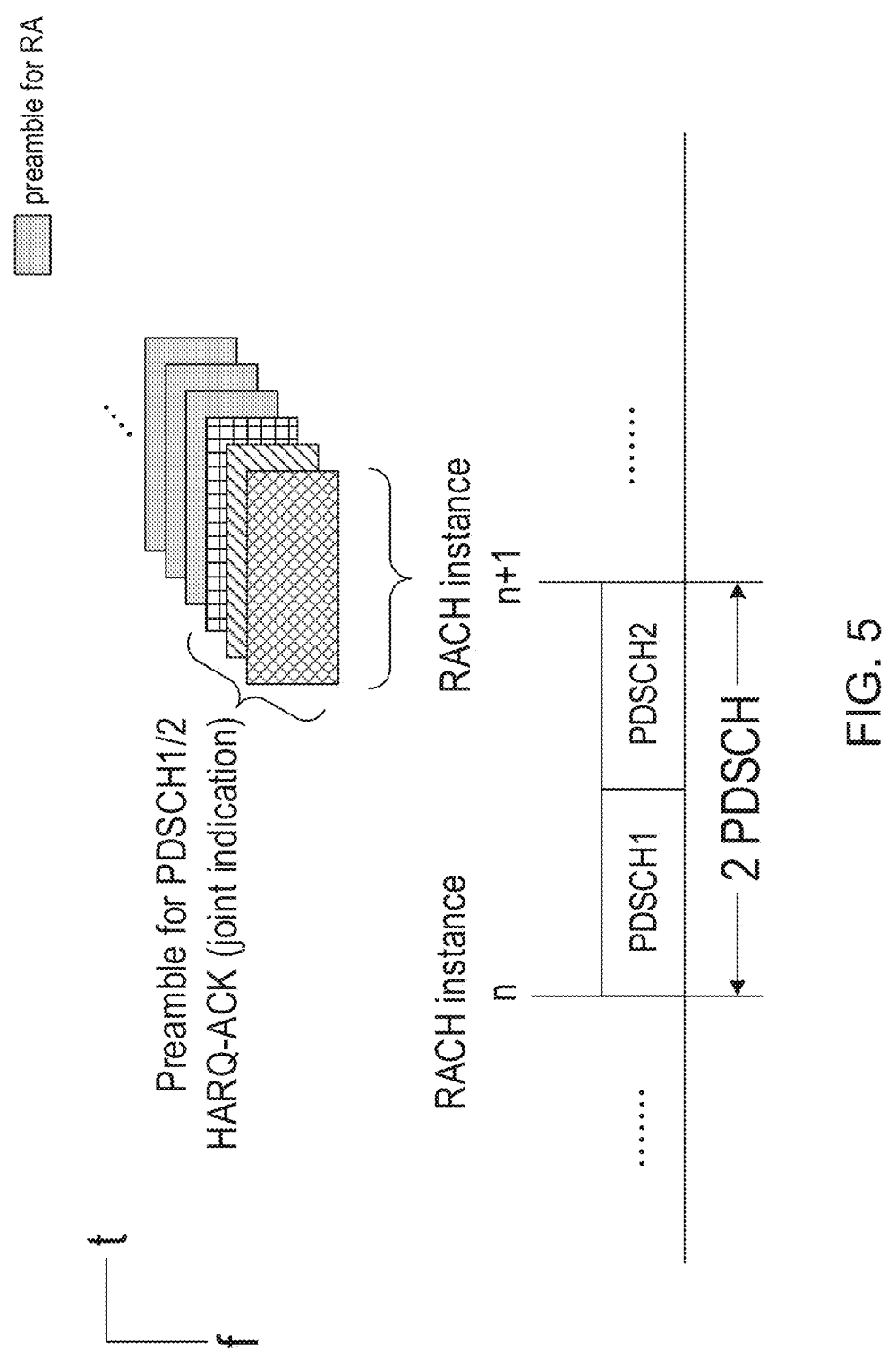
FIG. 5 shows an example HARQ-ACK feedback with joint coding.

As shown in FIG. 5 (assuming X=2), Embodiment 2 features HARQ-ACK feedback with joint coding and meanwhile either random access or HARQ-ACK feedback is performed (e.g., not at the same time). Thus, in some implementations, Embodiment 2 may have a similar feature as in Embodiment 1 where a preamble for HARQ-ACK feedback may not occupy the same time/frequency resources in a RO as a preamble for random access. However, in some implementations of Embodiment 2, the HARQ-ACK feedbacks for multiple shared channels (e.g., PDSCHs) can be jointly transmitted in a RO as further explained below.

In Embodiment 2, there are $(2^X)-1$ HARQ-ACK states representing the transmission results of X PDSCHs between two adjacent RACH instances. Let's take X=2 as an example. The 3 HARQ-ACK states for 2 PDSCHs are (NACK/DTX, ACK), (NACK/DTX, NACK/DTX) and (ACK, NACK/DTX). one of HARQ-ACK state is sent to gNB according to the decoding results of PDSCHs. The preambles for indicating the HARQ-ACK state (or HARQ-ACK preamble) will not be used for random access. An example is shown in FIG. 5 where X equals 2 and there are three HARQ-ACK state ($=2^X-1$), e.g., (NACK/DTX, ACK), (NACK/DTX, NACK/DTX) and (ACK, NACK/DTX), where each HARQ-ACK preamble can indicate one state. It is noted that no feedback from UE means (ACK, ACK). When we consider the feedback of the state of (ACK, ACK), the number of HARQ-ACK states becomes $2^X$.

The discussion on RAR in Embodiment 1 is still valid in Embodiment 2.

Embodiment 2 addresses the second feature of Embodiment 1, e.g., the number of RO must be X or larger thanks to the joint coding which enable HARQ-ACK preambles in one RO and flexible configuration of RO according to RA load at the cost of consuming more preamble for HARQ-ACK feedback (e.g., $2^X-1$). Note: the first problem in Embodiment 1 still exists.

III. Embodiment 3

Figure 6:
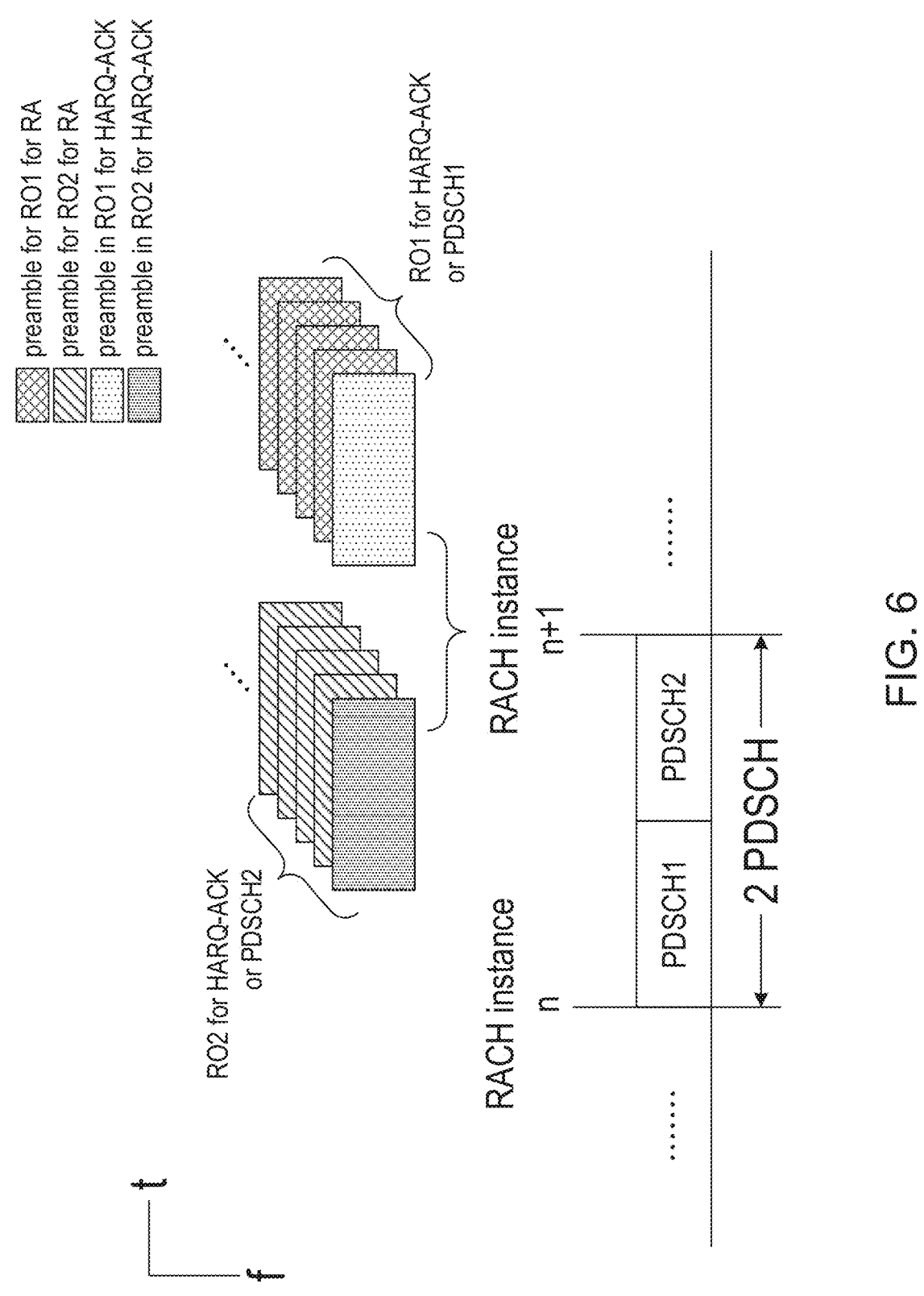
FIG. 6 shows an example technique where multiple types of preambles are associated with HARQ-ACK feedback and/or random access.

Embodiment 3 (shown in FIG. 6) exploits separate coding and there are two kinds of preambles, e.g., type1: HARQ-ACK preambles which are used only for HARQ-ACK feedback and type2: RA+HARQ-ACK preambles (or preambles for indicating to the gNB a combination of RA and HARQ-ACK feedback) which are sent by the UE when both HARQ-ACK feedback and random access are needed. In FIG. 6, the preambles for RO2 for RA and preambles for RO1 for RA represent type2 preambles (e.g., preambles for HARQ-ACK+RA), and the preamble in RO1 for HARQ-ACK and the preamble in RO2 for HARQ-ACK represent type1 preamble (e.g., the preamble for HARQ-ACK).

Embodiment 3 is trying to enable simultaneous operation of random access and HARQ-ACK feedback. The HARQ-ACK in type1 and type2 refers to NACK feedback or NACK/DTX feedback.

In Embodiment 3, one RO corresponds to one PDSCH. One HARQ-ACK preamble (e.g., one of the two dotted rectangles in FIG. 6) in the RO is used to indicate NACK or NACK/DTX state of the corresponding PDSCH and the remaining preambles are used as type 2 preambles which indicate NACK or NACK/DTX state of PDSCH corresponding to the RO and the UE is performing random access. For HARQ-ACK preamble, the RAR discussion in Embodiment 1 is still applicable.

One technical feature of Embodiment 3 is that gNB also needs to send different RARs for type2 preambles from different ROs when those preambles are sent by one UE, which results in resource waste. One way to solve this technical feature is to put a restriction that UE can only select type2 preamble from one RO. Another possible way is to introduce type3 preambles in each RO for ACK+RA (or a combination of acknowledgement and random access) indication, then gNB can send one RAR for all ROs as UE will send preamble in each RO when it needs to perform random access no matter the corresponding PDSCH is correctly decoded or not. This technique may consume more resources than the techniques in some of the other embodiments.

One problem of Embodiment 3 is how to perform random access when all PDSCHs are correct (e.g., no preamble will be sent at this time). there could be three options, e.g., Use RACH resources dedicated to random access which is anyway needed for legacy UE.

Use type3 preamble to indicate ACK+RA

Introduce type4 preambles in one or several RO(s), which are dedicated to indicating random access. UE will randomly select one of those type4 preambles when all PDSCHs are correct.

IV. Embodiment 4

Embodiment 2 does not solve the issue of how to perform random access and HARQ-ACK feedback at the same time for joint coding. We will address it in Embodiment 4.

Figure 7:
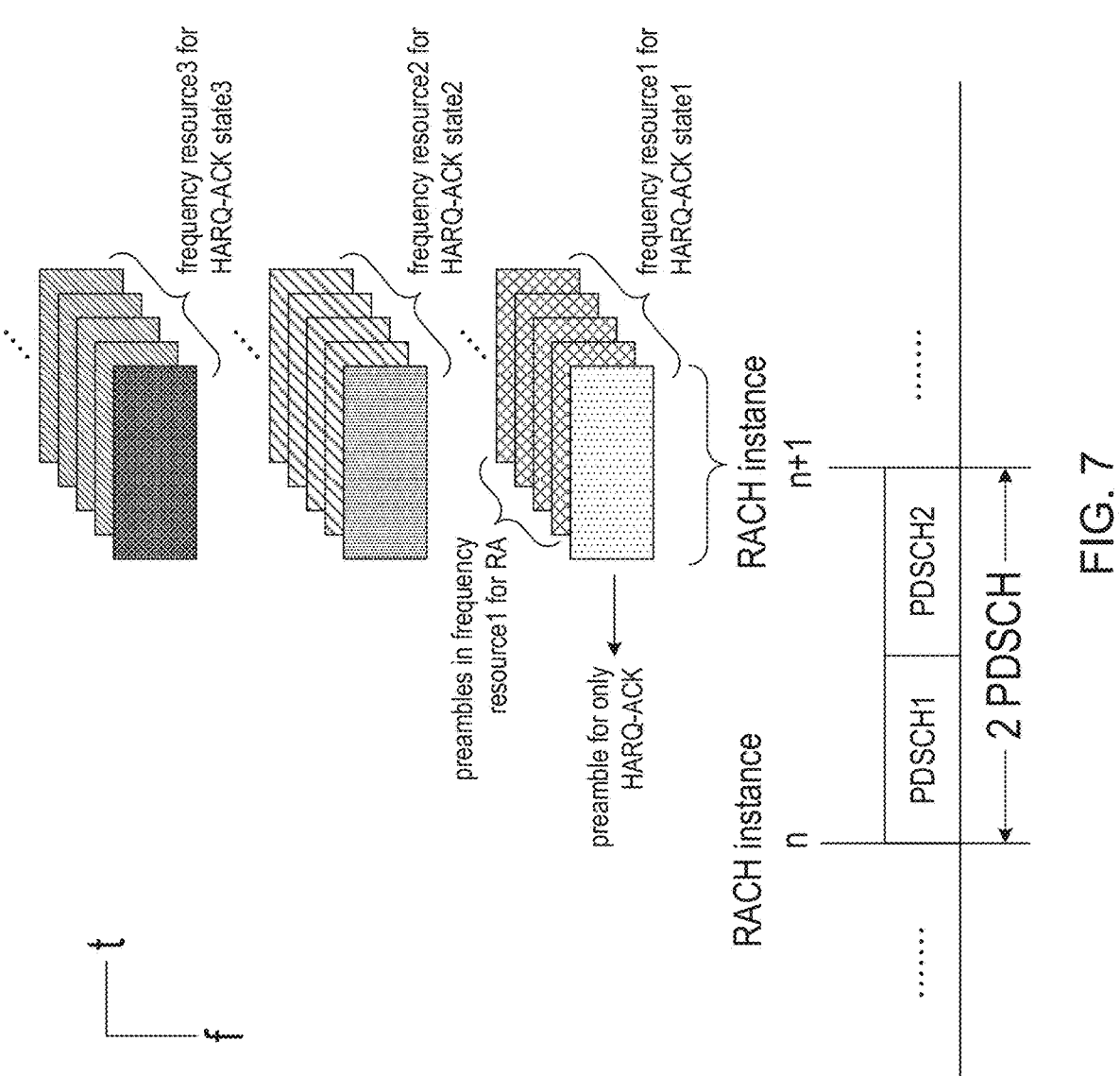
FIG. 7 shows an example frequency division multiplexing (FDM) based multiplexing technique.
Figure 8:
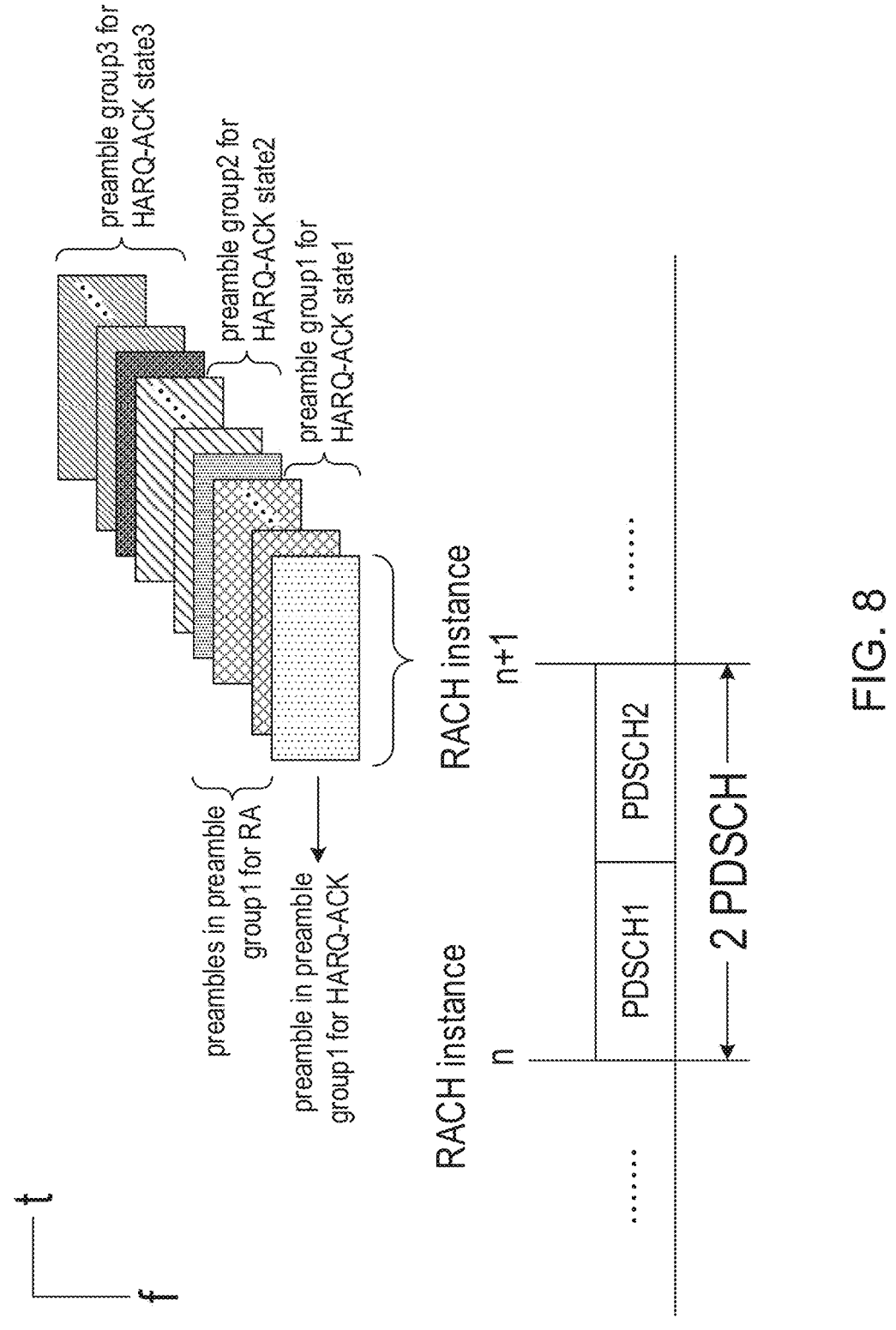
FIG. 8 shows an example code division multiplexing (CDM) based multiplexing technique.
Figure 9:
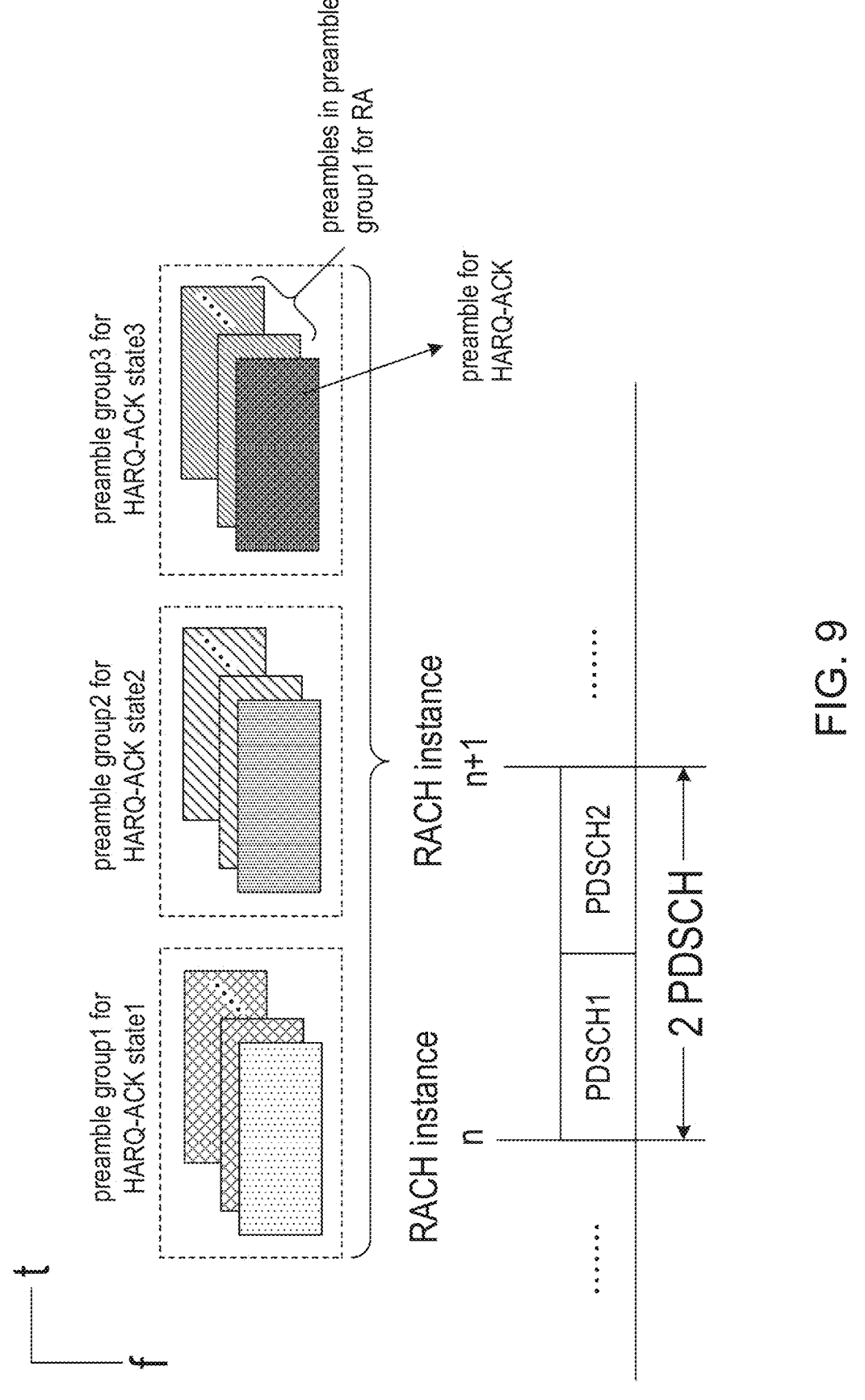
FIG. 9 shows an example time division multiplexing (TDM) based multiplexing technique.

We use different preamble sets for different HARQ-ACK states. In each set, one preamble is configured or selected according to predefined rule for the feedback of the corresponding HARQ-ACK state (e.g., HARQ-ACK preamble) and remaining preambles are harnessed for indicating the HARQ-ACK state and random access. Different sets can be frequency division multiplexed (FDMed) and/or code division multiplexed (CDMed) and/or time division multiplexed (TDMed) as shown in FIGS. 7 to 9, respectively.

Discussion on RAR for HARQ-ACK preamble in Embodiment 1 is also valid in this Embodiment.

It is noted that in order to save resources HARQ-ACK bundling among all or several PDSCHs can be done. Bundling means decoding failure of any PDSCH means feedback of NACK for those PDSCHs.

V. Embodiment 5

Figure 10:
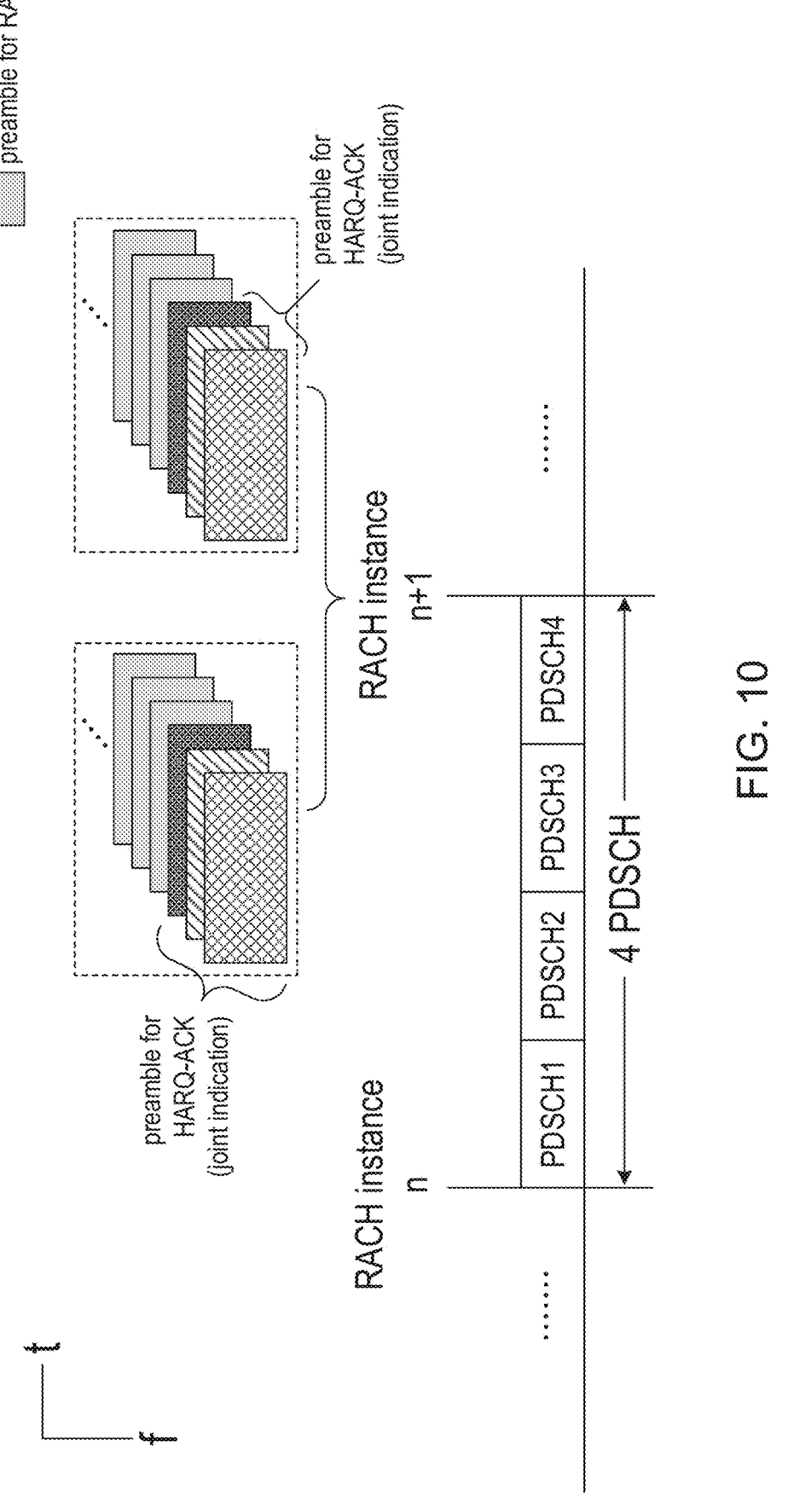
FIG. 10 shows an example hybrid scheme.

According to the analysis from Embodiment 1 to Embodiment 4, it can be seen that separate coding and joint coding have their respective technical features. Thus, one technique related to Embodiment 5 is to employ a hybrid scheme. For example, PDSCHs between two adjacent RACH instances are divided into several group. Joint coding is applied in each group and different group corresponds to different RO. This example is shown in FIG. 10. For example, as shown in FIG. 10, a group 1 for a first RO is associated with PDSCH1 and PDSCH2, and group 2 for a second RO is associated with PDSCH 3 and PDSCH 4. In this example, if the UE determines that all four PDSCHs are incorrect decoded, then the UE may employ joint coding techniques described in this patent document to transmit a preamble for HARQ-ACK in the first RO and a preamble for HARQ-ACK feedback in the second RO. In this example, the UE may not transmit a preamble for random access in the first or second ROs since it is used to transmit the HARQ-ACK feedbacks. In some embodiments, if X PDSCHs are divided into Y group when being assigned between two RACH instances, then there may be X/Y PDSCHs in each group and the UE can select a preamble from $2^{(X/Y)}$ preambles or $2^X-1$ preambles for transmission of HARQ-ACK feedback.

VI. Embodiment 6

Figure 11:
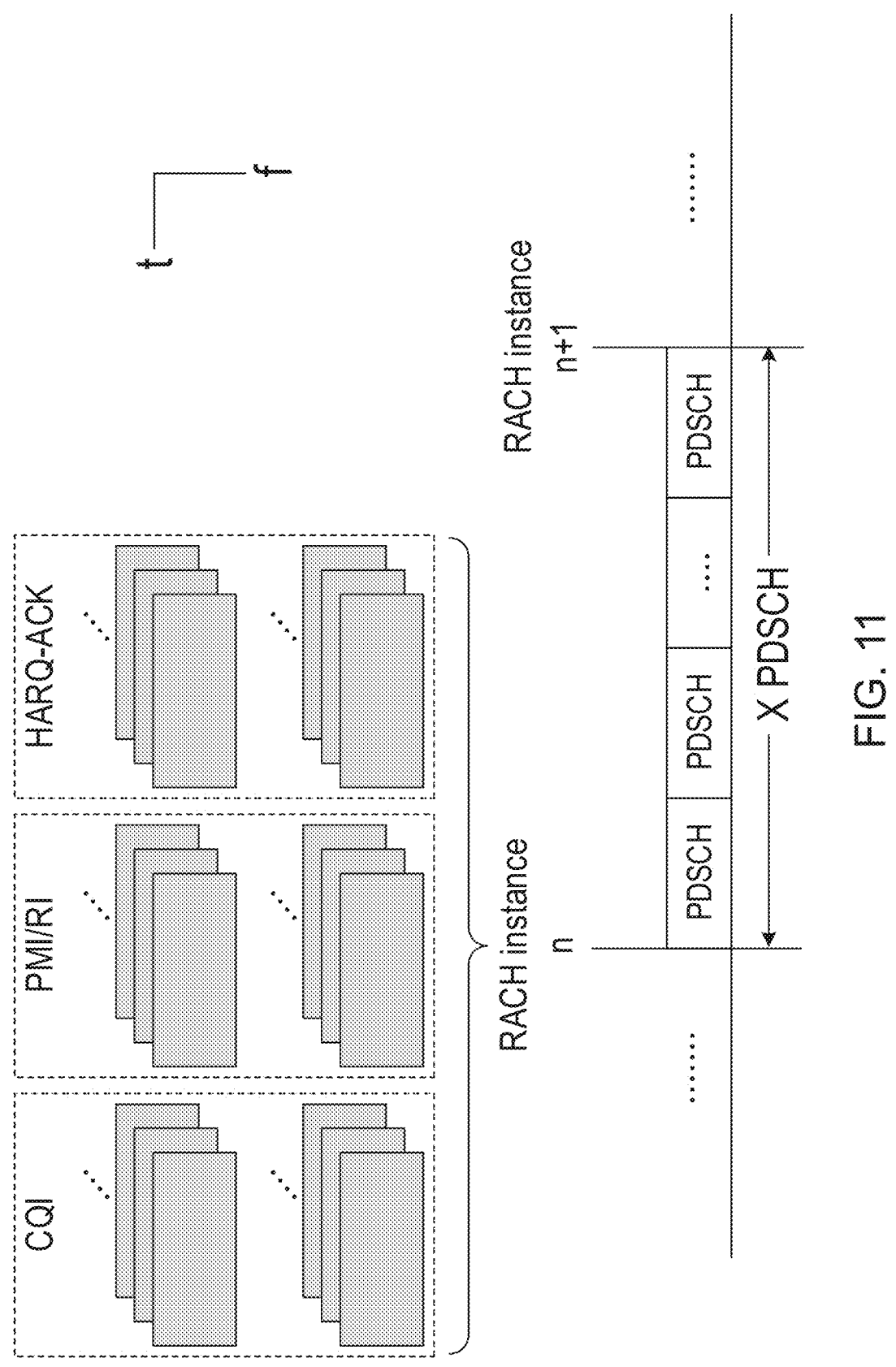
FIG. 11 shows an example channel state information (CSI) feedback with msg1.

One possible way of CSI feedback is to use msg1. as shown in FIG. 11, different RACH resources can be used for the feedback of different types of CSI. In this example, CQI and PMI/RI use RACH resources in different ROs. PMI and RI are joint coded. The reason of separately feeding back CQI and PMI/RI is that their feedback periodicity may be different. We can also consider joint coding of CQI, PMI and RI when we assume the same feedback periodicity. If we want to perform random access and CSI feedback simultaneously, the ideas in Embodiment 1~5 can be reused with substituting CSI states for HARQ-ACK states.

VII. Embodiment 7

In this Embodiment, we provide another method for HARQ-ACK and/or CSI feedback, e.g., carrying HARQ-ACK and/or CSI in msg3.

There are two problems for this method. The first one is latency. Msg3 based feedback will result in additional tens of milliseconds compared to msg1 based methods as discussed in Embodiment 1~Embodiment 7. But if we mainly care about a statistic result (e.g., BLER), this additional latency may be acceptable. In msg3, UE can also indicate gNB if the UE wants to enter RRC connected state or if msg4 is needed. Msg4 is used for contention resolution (e.g., two or more UEs happens to select the same preamble), which is necessary if gNB wants to receive feedback from both UEs when contention collision happens. Otherwise we can ignore the step of contention resolution and msg4 is not needed then.

Another problem is UL overhead. There may be thousands of idle state UE receiving MBS PDSCH. If all of them perform CSI feedback, UL overhead may be unacceptable. Meanwhile, the CSI feedback from the UE with much higher RSRP/RSRQ may not be necessary as gNB will perform link adaption based on the lowest CQI, so we can just let the UE with lower RSRP/RSR to perform CSI feedback. Another possible way is to trigger feedback when the BLER is lower than a certain threshold configured by gNB.

This patent document has described at least the following techniques/features in the embodiments described above:

Technique 1: Methods for HARQ-ACK Feedback

Method 1 (Embodiment 1/3): For separate HARQ-ACK feedback of X PDSCHs (or PDCCH MO) in time domain (Embodiments 1, 3). This technique may include some or all of the following features The X PDSCHs are transmitted between two adjacent RACH instances One RACH instance has Y RACH occasions (ROs) in time domain.

Y can be equal to X

If Y>X, then Y ROs can be divided to X groups and each group corresponds to one PDSCH. Or configure or select X ROs based on predefined rule from Y ROs.

Each RO or RO group is for the transmission of HARQ-ACK of one PDSCH and consists of W time domain PRACH resources W can be equal to 1.

There could be Z PRACH frequency resource (Z>=1) in each RO. Each PRACH frequency resource comprises several physical resource blocks (e.g., 6).

There may be at least one part or type among three parts of preambles in one RO;

Part1 (or type1 preamble) consists of one preamble only for HARQ-ACK feedback of the PDSCH corresponding to the RO;

In some embodiment, the preamble may be used to indicate the size of msg3, e.g., one or more preambles indicate 0 bit msg3 which implies RACH procedure is terminated after msg2 or msg1.

Part2 (or type2 preamble) consists of a preamble from N preambles for NACK only feedback+random access UE can only select part 2 preamble from one RO Part3 consists of a preamble from M preambles for random access In some embodiments, M can be equal to N.

In some embodiments, the preambles in each RO may come from one or more PRACH frequency resource opportunity at the RO.

In some embodiments, the part3 preamble may not exist in every RO. It can be used to indicate random access when all PDSCHs are correct.

Part4 (or type3 preamble) consists of a preamble from P preambles for indicating random access+ACK In some embodiments, P can be equal to N.

In some embodiments, the preambles in each RO may come from one or more PRACH frequency resource opportunity at the RO.

In some embodiments, the part4 preamble may not exist in every RO.

Method 1 may need X ROs at each PRACH instance, which incurs less flexibility for RO allocation.

Method 2 (Embodiment 2/4): For joint coding of HARQ-ACK of X PDSCH (or PDCCH MO) in time domain (Embodiment 2, 4)

The X PDSCHs are transmitted between two adjacent RACH instances

One RACH instance has Y ROs in time domain.

Y can be equal to 1

Each RO is for the transmission of HARQ-ACK of X PDSCHs and consists of W time domain PRACH resources W is usually equal to 1.

There could be Z PRACH frequency resource (Z>=1) in each RO. Each PRACH frequency resource comprises several physical resource blocks (e.g., 6).

There may be at least one part among three parts of preambles in each RO;

Part 1 consists of $2^X$ or $2^X-1$ preambles only for HARQ-ACK feedback of the X PDSCHs corresponding to the RO; Each preamble represents one HARQ-ACK state.

If we need to HARQ-ACK feedback when all X PDSCHs are correct, then there are $2^X$ preambles. Otherwise $2^X-1$ preambles are enough.

Take X=2 as an example, the $2^X-1$ HARQ-ACK states are (NACK/DTX, ACK), (NACK/DTX, NACK/DTX) and (ACK, NACK/DTX) if state of (ACK, ACK) is not fed back.

Note: In some embodiments, a preamble may be used to indicate the size of msg3, e.g., one or more preambles indicate 0 bit msg3 which implies RACH procedure is terminated after msg2 or msg1.

Part 2 consists of $2^X*N$ or $(2^X-1)*N$ preambles for HARQ-ACK feedback+random access (RA), e.g., $2^X$ (or $2^X-1$) groups representing $2^X$ (or $2^X-1$) HARQ-ACK states and N preambles in each group can be randomly selected for RA;

Note: we can also say N groups for RA (e.g., Randomly select one group for RA) and $2^X$ (or $2^X-1$) preambles in each group (e.g., preamble in one group represents one of $2^X$ (or $2^X-1$) HARQ-ACK states)

Part 3 consists of M preambles only for random access

Note1: M can be equal to N;

Note2: the preamble in each RO may come from one or more PRACH frequency resource opportunity at the RO, e.g., different parts or the different preamble groups are either CDMed and/or FDMed and/or TDMed (see Embodiments 4, 5 for detailed embodiment).

The joint coding of HARQ-ACK can be done for the PDSCHs with the same priority or used for the transmission of the same traffic.

Method 3 (Embodiment 5)—Hybrid scheme

The X PDSCHs are transmitted between two adjacent RACH instances, which are divided into Y group.

One RACH instance has at least Y ROs in time domain.

Joint coding as elaborated in method 2 is used in each RO and different ROs are used for different group.

In some embodiments, for aforementioned methods, the PDSCHs may be regarded as correctly received if UE doesn't intend to received them. (e.g., if UE is not interested in the corresponding traffics transmitted in those PDSCHs)

Technique 2: Msg1 Based Method for CSI or BLER Feedback (Embodiment 6)

Using the methods in Technique 1 to indicate BLER or CSI.

Using different ROs for CQI (or BLER) and PMI/RI feedback respectively

In the RO for CQI (or BLER) feedback, FDMed or CDMed resource can be used to indicate different CQI In the RO for PMI/RI feedback, FDMed or CDMed resource can be used to indicate different PMI/RI HARQ-HACK, BLER or CSI feedback is only performed for UEs which satisfy certain conditions, e.g., RSRP/RSRQ larger than a threshold. Or fail to (or successfully) receive a certain message.

Technique 3: For the Preambles Coming from Part1 in Technique 1, there May be, for Example, Two Alternatives for RAR Transmission Alt1: gNB will NOT transmit RAR (or msg2) for it. Or UE will NOT expect or try to detect RAR for the preamble. Or the RACH procedure is terminated after msg1 transmission. A technical benefit of Alt1 is that can save overhead as msg2 is not needed.

Alt2: gNB will transmit RAR (or msg2) for it. Or UE will expect or try to detect RAR for the preamble. Or the RACH procedure is terminated after msg2 transmission. The RAR is characterized by at least one of the following features Only RA-preamble identifier or RA-preamble identifier and TA (timing advance) is included in RAR (e.g., UL GRANT for msg3 and temporary C-RNTI are absent).

Only msg1 and msg2 are sent, e.g., RACH procedure is terminated after the transmission of msg2 (e.g., no msg3 and msg4)

Higher power (e.g., power ramp-up) could be used for the next transmission of the HARQ-ACK preamble if UE doesn't receive msg2 before a certain time point. Moreover there are two possibilities for the power ramp-up, e.g., (1) no retransmission of the HARQ-ACK for which RAR is not received and the power ramp-up is for the transmission of a HARQ-ACK preamble for another one or several PDSCHs; (2) do retransmission for the HARQ-ACK for which RAR is not received with power ramp-up.

One RAR for the HARQ-ACK preambles (or part1 preambles) in multiple ROs

Those ROs locate in one or several RACH instance(s)

Note: This idea is mainly for method 1 (e.g., separate coding), but it may also be applicable to method 2. For example, the PDSCHs between two RACH instances are divided into several groups and the joint coding is performed on group basis. One HARQ-ACK preamble will be sent for the PDSCH in one group, then there could be one RAR for the HARQ-ACK preambles of different groups.

The technique in Alt2 is more robust as UE can know if the HARQ-ACK feedback is received by gNB and UE will send the preamble again with higher power or send.

Technique 4: Msg3 Based Method for HARQ-ACK and/or BLER and/or CSI Feedback (Embodiment 7)

Carrying HARQ-ACK, BLER and/or CSI measured in msg3, which is characterized by one or more following features Further indicate in msg3 if UE wants to enter RRC connected state Msg4 is absent if msg3 carries HARQ-ACK, CSI or BLER and implying no need of entering RRC connected state.

HARQ-HACK, BLER or CSI feedback is only performed for UEs which satisfy certain conditions, e.g., RSRP/RSRQ larger than a threshold. Or fail to (or successfully) receive a certain message. Or the BLER is lower than a certain threshold.

FIG. 1 shows an exemplary flowchart for performing a transmission of a preamble by a communication device. Operation 102 includes receiving, by a communication device, X shared channels from a network device, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X. Operation 104 includes transmitting, by the communication device, a preamble in at least one RACH occasion from the Y RACH occasions, wherein the preamble indicates exactly one of: (1) a feedback associated with a shared channel from the X shared channels, or (2) a random access.

In some embodiments, in response to Y being greater than X, the Y RACH occasions are associated with X RACH occasion groups, and each of the X RACH occasion groups is associated with one shared channel to be received by the communication device. In some embodiments, in response to Y being greater than X, the Y RACH occasions are associated with X RACH occasion groups, and the X RACH occasion groups are selected from the Y RACH occasions based on a predefined rule. In some embodiments, each of the Y RACH occasions or each of the X RACH occasion groups is associated with a transmission of the preamble for a hybrid automatic repeat request acknowledgment (HARQ-ACK) of one shared channel by the communication device, each of the Y RACH occasions or each of the X RACH occasion groups includes W time domain physical RACH (PRACH) resources, and W is an integer. In some embodiments, each of the Y RACH occasions includes Z physical RACH (PRACH) frequency resources, each of the Z PRACH frequency resources includes a plurality of physical resource blocks, and Z is an integer greater than or equal to 1. In some embodiments, the at least one RACH occasion of the Y RACH occasions includes a transmission of the preamble that only indicates a hybrid automatic repeat request acknowledgment (HARQ-ACK) of the shared channel corresponding to the at least one RACH occasion.

In some embodiments, the at least one RACH occasion of the Y RACH occasions includes a transmission of the preamble from N preambles that indicates a combined non-acknowledgement (NACK) only feedback and random access by the communication device, and N is an integer. In some embodiments, the at least one RACH occasion of the Y RACH occasions includes a transmission of the preamble from M preambles for random access, and M is an integer.

FIG. 14 shows another exemplary flowchart for performing a transmission of a preamble by a communication device. Operation 1402 includes receiving, by a communication device, X shared channels from a network device, wherein the X shared channels are located in between a first random access channel (RACH) instance and a second RACH instance in time wherein X and Y are integers, and wherein Y is greater than or equal to X. Operation 1404 includes transmitting, by the communication device, a preamble in each RACH occasion from the Y RACH occasions, wherein the preamble indicates exactly one of: (1) a feedback associated with at least one shared channel from the X shared channel, or (2) a random access.

In some embodiments, each of the Y RACH occasions is associated with a transmission of a hybrid automatic repeat request acknowledgment (HARQ-ACK) of the at least one shared channel from the X shared channels by the communication device, each of the Y RACH occasions includes W time domain physical RACH (PRACH) resources, and W is an integer. In some embodiments, each RACH occasion of the Y RACH occasions the preamble from $2^X$ preambles or $2^X-1$ preambles that only indicate a hybrid automatic repeat request acknowledgment (HARQ-ACK) of the at least one shared channel from the X shared channels. In some embodiments, each RACH occasion of the Y RACH occasions includes the preamble from $(2^X)*N$ preambles or $(2^X-1)*N$ preambles that indicate a combined non-acknowledgement (NACK) only feedback and random access, and N is an integer. In some embodiments, each RACH occasion of the Y RACH occasions includes the preamble from M preambles that indicate random access, and M is an integer.

FIG. 15 shows another exemplary flowchart for performing a transmission of a preamble by a communication device. Operation 1502 includes receiving, by a communication device, X shared channels from a network device, wherein the X shared channels are located in between a first random access channel (RACH) instance and a second RACH instance in time domain, wherein the X shared channels are associated with Y groups, wherein each group of the Y groups includes one or more shared channels from the X shared channels, wherein the second RACH instance includes at least Y RACH occasions in time domain, and wherein X and Y are integers. Operation 1504 includes transmitting, by the communication device, a preamble in at least one RACH occasion of the Y RACH occasions, wherein the preamble indicate any one or more of: (1) a feedback associated with at a group comprising at least one shared channel from the X shared channel, or (2) a random access.

In some embodiments, the at least one RACH occasion is associated with a transmission of the preamble that is associated with a hybrid automatic repeat request acknowledgment (HARQ-ACK) of the group comprising the at least one shared channel, the at least one RACH occasion includes W time domain physical RACH (PRACH) resources, and W is an integer. In some embodiments, the at least one RACH occasion of the Y RACH occasions includes a transmission of the preamble from $2^{(X/Y)}$ preambles or $2^X - 1$ preambles that only indicate a hybrid automatic repeat request acknowledgment (HARQ-ACK) of the at least one shared channel. In some embodiments, the at least one RACH occasion of the Y RACH occasions includes a transmission of the preamble from $(2^X)*N$ preambles or $(2^X - 1)*N$ preambles that indicate a combined non-acknowledgement (NACK) only feedback and random access, and N is an integer. In some embodiments, the at least one RACH occasion of the Y RACH occasions includes a transmission of the preamble from M preambles for random access, and M is an integer. In some embodiments, the communication device is operating in a low power state that includes an idle state or an inactive state.

FIG. 16 shows another exemplary flowchart for receiving a preamble by a network device. Operation 1602 includes transmitting, by a network device, X shared channels, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X. Operation 1604 includes receiving, by the network device, a preamble in at least one RACH occasion from the Y RACH occasions, wherein the preamble indicates exactly one of: (1) a feedback associated with a shared channel from the X shared channels, or (2) a random access.

In some embodiments, in response to Y being greater than X, the Y RACH occasions are associated with X RACH occasion groups, and each of the X RACH occasion groups is associated with one shared channel to be transmitted by the network device. In some embodiments, in response to Y being greater than X, the Y RACH occasions are associated with X RACH occasion groups, and the X RACH occasion groups are from the Y RACH occasions based on a pre-defined rule. In some embodiments, each of the Y RACH occasions or each of the X RACH occasion groups is associated with a reception of the preamble for a hybrid automatic repeat request acknowledgment (HARQ-ACK) of one shared channel by the network device, each of the Y RACH occasions or each of the X RACH occasion groups includes W time domain physical RACH (PRACH) resources, and W is an integer. In some embodiments, each of the Y RACH occasions includes Z physical RACH (PRACH) frequency resources, each of the Z PRACH frequency resources includes a plurality of physical resource blocks, and Z is an integer greater than or equal to 1. In some embodiments, the at least one RACH occasion of the Y RACH occasions includes a reception of the preamble that only indicates a hybrid automatic repeat request acknowledgment (HARQ-ACK) of the shared channel corresponding to the at least one RACH occasion. In some embodiments, the at least one RACH occasion of the Y RACH occasions includes a reception of the preamble from N preambles that indicates a combined non-acknowledgement (NACK) only feedback and random access by the network device, and N is an integer.

In some embodiments, the at least one RACH occasion of the Y RACH occasions includes a reception of the preamble from M preambles for random access, and M is an integer.

FIG. 17 shows another exemplary flowchart for receiving a preamble by a network device. Operation 1702 includes transmitting, by a network device, X shared channels, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X. Operation 1704 includes receiving, by the network device, a preamble in each RACH occasion from the Y RACH occasions, wherein the preamble indicates exactly one of: (1) a feedback associated with at least one shared channel from the X shared channel, or (2) a random access.

In some embodiments, each of the Y RACH occasions is associated with a reception of a hybrid automatic repeat request acknowledgment (HARQ-ACK) of the at least one shared channel from the X shared channels by the network device, each of the Y RACH occasions includes W time domain physical RACH (PRACH) resources, and W is an integer. In some embodiments, each RACH occasion of the Y RACH occasions the preamble from $2^X$ preambles or $2^X - 1$ preambles that only indicate a hybrid automatic repeat request acknowledgment (HARQ-ACK) of the at least one shared channel from the X shared channels. In some embodiments, each RACH occasion of the Y RACH occasions includes the preamble from $(2^X)*N$ preambles or $(2^X - 1)*N$ preambles that indicate a combined non-acknowledgement (NACK) only feedback and random access, and N is an integer. In some embodiments, each RACH occasion of the Y RACH occasions includes the preamble from M preambles that indicate random access, and M is an integer.

FIG. 18 shows another exemplary flowchart for receiving a preamble by a network device. Operation 1802 includes transmitting, by a network device, X shared channels, wherein the X shared channels are located in between a first random access channel (RACH) instance and a second RACH instance in time domain, wherein the X shared channels are associated with Y groups, wherein each group of the Y groups includes one or more shared channels from the X shared channels, wherein the second RACH instance includes at least Y RACH occasions in time domain, and wherein X and Y are integers. Operation 1804 includes receiving, by the network device, a preamble in at least one RACH occasion of the Y RACH occasions, wherein the preamble indicate any one or more of: (1) a feedback associated with at a group comprising at least one shared channel from the X shared channel, or (2) a random access.

In some embodiments, the at least one RACH occasion is associated with a reception of the preamble that is associated with a hybrid automatic repeat request acknowledgment (HARQ-ACK) of the group comprising the at least one shared channel, the at least one RACH occasion includes W time domain physical RACH (PRACH) resources, and W is an integer. In some embodiments, the at least one RACH occasion of the Y RACH occasions includes a reception of the preamble that only indicates a hybrid automatic repeat request acknowledgment (HARQ-ACK) of the at least one shared channel.

In some embodiments, the at least one RACH occasion of the Y RACH occasions includes a reception of the preamble from $(2^X)*N$ preambles or $(2^X-1)*N$ preambles that indicate a combined non-acknowledgement (NACK) only feedback and random access, and N is an integer. In some embodiments, the at least one RACH occasion of the Y RACH occasions includes a reception of the preamble from M preambles for random access, and M is an integer.

FIG. 19 shows another exemplary flowchart for receiving a preamble by a network device. Operation 1902 includes transmitting, by a network device, X shared channels, wherein the X shared channels are located in between a first random access channel (RACH) instance and a second RACH instance in time domain, wherein the second RACH instance includes Y RACH occasions in time domain, and wherein X and Y are integers. Operation 1904 includes receiving, by the network device, a preamble in at least one RACH occasion of the Y RACH occasions, wherein the preamble indicate any one or more of: (1) a feedback associated with at least one shared channel from the X shared channel, or (2) a random access, and wherein the network device determines not to transmit a response message in response to the receiving the preamble.

FIG. 20 shows another exemplary flowchart for receiving a preamble by a network device. Operation 2002 includes transmitting, by a network device, X shared channels, wherein the X shared channels are located in between a first random access channel (RACH) instance and a second RACH instance in time domain, wherein the second RACH instance includes Y RACH occasions in time domain, and wherein X and Y are integers. Operation 2004 includes receiving, by the network device, a preamble in at least one RACH occasion of the Y RACH occasions, wherein the preamble indicates a feedback associated with at least one shared channel from the X shared channels. Operation 2006 includes determining, by the network device, not to transmit a response message in response to the preamble indicating the feedback associated with the at least one shared channel from the X shared channels, or transmitting, by the network device, another response message that includes only an identifier of the preamble or the identifier of the preamble and a timing advance, wherein the preamble is received by the network device indicating the feedback associated with the at least one shared channel from the X shared channels.

In some embodiments, the network device terminates a random access process after the transmitting the another response message. In some embodiments, the method further comprises receiving, by the network device, another preamble with higher power in response to the another response message that is not received by a communication device. In some embodiments, the another preamble indicates the feedback associated with the at least one shared channel located in between a third random access channel (RACH) instance and a forth RACH instance in time domain, or the another preamble is a retransmission of the preamble indicating the feedback associated with the at least one shared channel from the X shared channels In some embodiments, the method further comprises receiving, by the network device and prior to the transmitting the another response message, another preamble for the random access in another RACH occasion of the Y RACH occasion, wherein the transmitting the another response message is in response to the receiving of the preamble and the receiving of the another preamble, where the preamble and the another preamble indicate the feedback associated with the at least one shared channel from the X shared channels.

FIG. 21 shows another exemplary flowchart for transmitting a preamble by a communication device. Operation 2102 includes receiving, by a communication device, X shared channels from a network device, wherein the X shared channels are located in between a first random access channel (RACH) instance and a second RACH instance in time domain, wherein the second RACH instance includes Y RACH occasions in time domain, and wherein X and Y are integers. Operation 2104 includes transmitting, by the communication device, a preamble in at least one RACH occasion of the Y RACH occasions, wherein the preamble indicates a feedback associated with at least one shared channel from the X shared channels. Operation 2106 includes receiving, by the communication device, another response message that includes only an identifier of the preamble or the identifier of the preamble and a timing advance, wherein the preamble is transmitted by the communication device indicating the feedback associated with the at least one shared channel from the X shared channels.

In some embodiments, the method further comprises transmitting, by the communication device, another preamble with higher power in response to the another response message that is not received by the communication device. In some embodiments, the another preamble indicates the feedback associated with the at least one shared channel located in between a third random access channel (RACH) instance and a forth RACH instance in time domain, or the another preamble is a retransmission of the preamble indicating the feedback associated with the at least one shared channel from the X shared channels. In some embodiments, the method further comprises transmitting, by the communication device and prior to the receiving the another response message, another preamble for the random access in another RACH occasion of the Y RACH occasion, wherein the receiving the another response message is in response to the transmitting of the preamble and the transmitting of the another preamble, where the preamble and the another preamble indicate the feedback associated with the at least one shared channel from the X shared channels. In some embodiments, the network device includes a base station.

Figure 12:
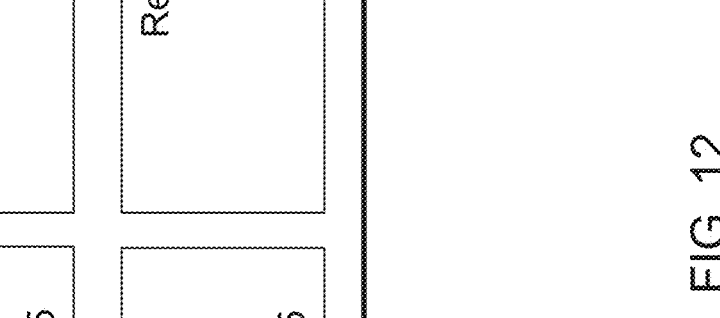
FIG. 12 shows an exemplary block diagram of a hardware platform that may be a part of a network device or a communication device.

FIG. 12 shows an exemplary block diagram of a hardware platform 1200 that may be a part of a network device (e.g., base station) or a communication device (e.g., a user equipment (UE)). The hardware platform 1200 includes at least one processor 1210 and a memory 1205 having instructions stored thereupon. The instructions upon execution by the processor 1210 configure the hardware platform 1200 to perform the operations described in FIGS. 1 to 11 and FIGS. 13 to 21 and in the various embodiments described in this patent document. The transmitter 1215 transmits or sends information or data to another device. For example, a network device transmitter can send a message to a user equipment. The receiver 1220 receives information or data transmitted or sent by another device. For example, a user equipment can receive a message from a network device.

Figure 13:
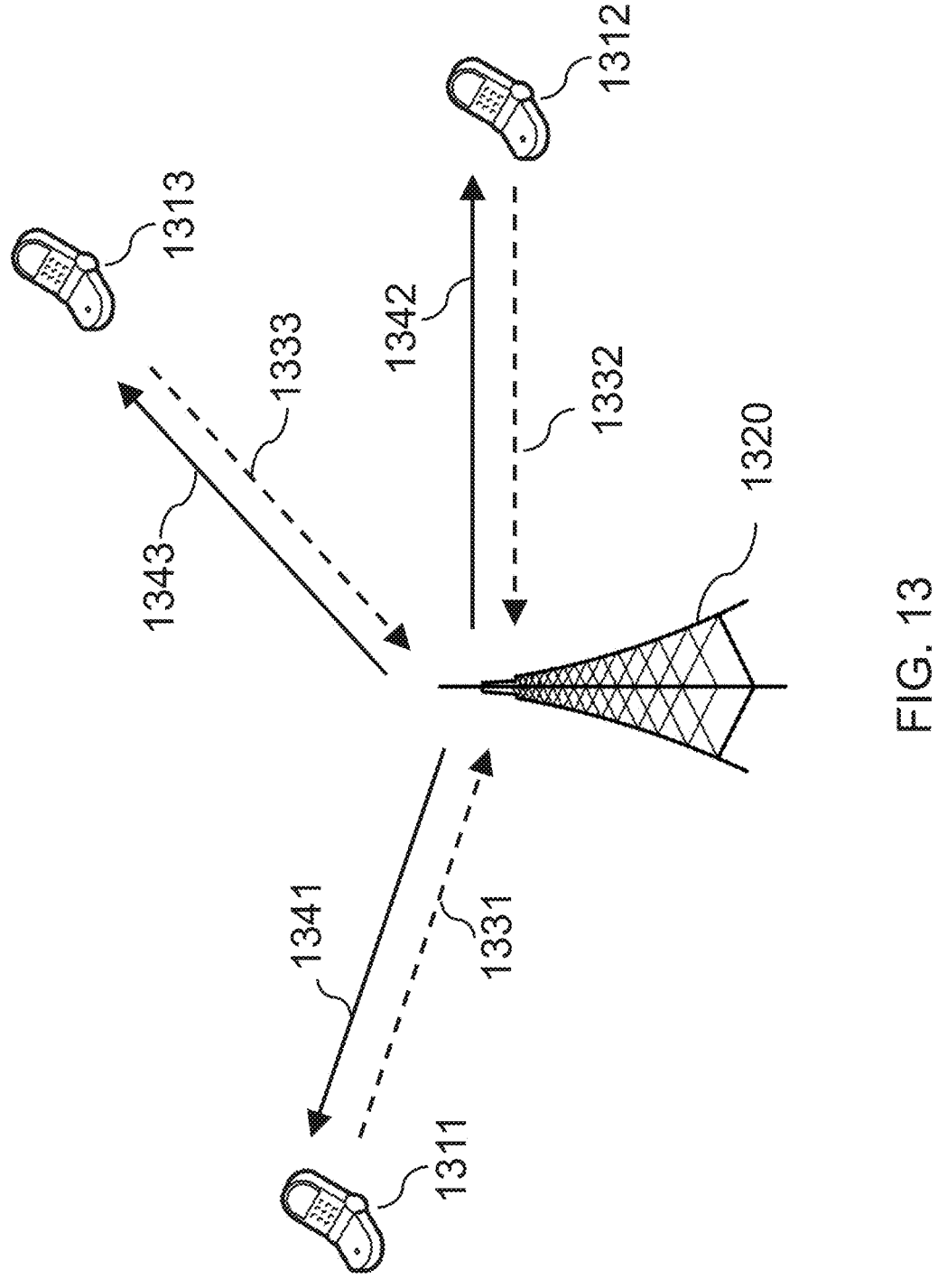
FIG. 13 shows an example of wireless communication including a base station (BS) and user equipment (UE) based on some implementations of the disclosed technology.

The implementations as discussed above will apply to a wireless communication. FIG. 13 shows an example of a wireless communication system (e.g., a 5G or NR cellular network) that includes a base station 1320 and one or more user equipment (UE) 1311, 1312 and 1313. In some embodiments, the UEs access the BS (e.g., the network) using a communication link to the network (sometimes called uplink direction, as depicted by dashed arrows 1331, 1332, 1333), which then enables subsequent communication (e.g., shown in the direction from the network to the UEs, sometimes called downlink direction, shown by arrows 1341, 1342, 1343) from the BS to the UEs. In some embodiments, the BS send information to the UEs (sometimes called downlink direction, as depicted by arrows 1341, 1342, 1343), which then enables subsequent communication (e.g., shown in the direction from the UEs to the BS, sometimes called uplink direction, shown by dashed arrows 1331, 1332, 1333) from the UEs to the BS. The UE may be, for example, a smartphone, a tablet, a mobile computer, a machine to machine (M2M) device, an Internet of Things (IoT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a communication device, X shared channels from a network device,
   wherein the X shared channels are located in between a first random access channel (RACH) instance and a second RACH instance in time domain,
   wherein the second RACH instance includes Y RACH occasions in time domain,
   wherein X and Y are integers, and
   wherein Y is greater than or equal to X; and
transmitting, by the communication device, a preamble in at least one RACH occasion from the Y RACH occasions,
   wherein the preamble indicates exactly one of: (1) a feedback associated with a shared channel from the X shared channels, or (2) a random access.

2. The method of claim 1,
wherein in response to Y being greater than X, the Y RACH occasions are associated with X RACH occasion groups, and
wherein each of the X RACH occasion groups is associated with one shared channel to be received by the communication device.

3. The method of claim 1,
wherein in response to Y being greater than X, the Y RACH occasions are associated with X RACH occasion groups, and
wherein the X RACH occasion groups are selected from the Y RACH occasions based on a predefined rule.

4. The method of claim 2,
wherein each of the Y RACH occasions or each of the X RACH occasion groups is associated with a transmission of the preamble for a hybrid automatic repeat request acknowledgment (HARQ-ACK) of one shared channel by the communication device,
wherein each of the Y RACH occasions or each of the X RACH occasion groups includes W time domain physical RACH (PRACH) resources, and
wherein W is an integer.

5. The method of claim 1,
wherein each of the Y RACH occasions includes Z physical RACH (PRACH) frequency resources,
wherein each of the Z PRACH frequency resources includes a plurality of physical resource blocks, and
wherein Z is an integer greater than or equal to 1.

6. The method of claim 1, wherein the at least one RACH occasion of the Y RACH occasions includes a transmission of the preamble that only indicates a hybrid automatic repeat request acknowledgment (HARQ-ACK) of the shared channel corresponding to the at least one RACH occasion.

7. The method of claim 1, wherein the at least one RACH occasion of the Y RACH occasions includes a transmission of the preamble from N preambles that indicates a combined non-acknowledgement (NACK) only feedback and random access by the communication device, and wherein N is an integer.

8. A wireless communication method, comprising:

transmitting, by a network device, X shared channels, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X; and receiving, by the network device, a preamble in at least one RACH occasion from the Y RACH occasions, wherein the preamble indicates exactly one of: (1) a feedback associated with a shared channel from the X shared channels, or (2) a random access.

9. The method of claim 8, wherein in response to Y being greater than X, the Y RACH occasions are associated with X RACH occasion groups, and wherein each of the X RACH occasion groups is associated with one shared channel to be transmitted by the network device.

10. The method of claim 8, wherein in response to Y being greater than X, the Y RACH occasions are associated with X RACH occasion groups, and wherein the X RACH occasion groups are from the Y RACH occasions based on a predefined rule.

11. The method of claim 9, wherein each of the Y RACH occasions or each of the X RACH occasion groups is associated with a reception of the preamble for a hybrid automatic repeat request acknowledgment (HARQ-ACK) of one shared channel by the network device, wherein each of the Y RACH occasions or each of the X RACH occasion groups includes W time domain physical RACH (PRACH) resources, and wherein W is an integer.

12. The method of claim 8, wherein each of the Y RACH occasions includes Z physical RACH (PRACH) frequency resources, wherein each of the Z PRACH frequency resources includes a plurality of physical resource blocks, and wherein Z is an integer greater than or equal to 1.

13. The method of claim 8, wherein the at least one RACH occasion of the Y RACH occasions includes a reception of the preamble that only indicates a hybrid automatic repeat request acknowledgment (HARQ-ACK) of the shared channel corresponding to the at least one RACH occasion.

14. The method of claim 8, wherein the at least one RACH occasion of the Y RACH occasions includes a reception of the preamble from N preambles that indicates a combined non-acknowledgement (NACK) only feedback and random access by the network device, wherein N is an integer.

15. An apparatus for wireless communication comprising at least one processor, configured to implement a method, the at least one processor configured to:

receive, by a communication device, X shared channels from a network device, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X; and transmit, by the communication device, a preamble in at least one RACH occasion from the Y RACH occasions, wherein the preamble indicates exactly one of: (1) a feedback associated with a shared channel from the X shared channels, or (2) a random access.

16. The apparatus of claim 15, wherein in response to Y being greater than X, the Y RACH occasions are associated with X RACH occasion groups, and wherein each of the X RACH occasion groups is associated with one shared channel to be received by the communication device.

17. The apparatus of claim 15, wherein in response to Y being greater than X, the Y RACH occasions are associated with X RACH occasion groups, and wherein the X RACH occasion groups are selected from the Y RACH occasions based on a predefined rule.

18. An apparatus for wireless communication comprising at least one processor, configured to implement a method, the at least one processor configured to:

transmit, by a network device, X shared channels, wherein the X shared channels are located in between a first random access channel (RACH) instance and a second RACH instance in time domain, wherein the second RACH instance includes Y RACH occasions in time domain, wherein X and Y are integers, and wherein Y is greater than or equal to X; and receive, by the network device, a preamble in at least one RACH occasion from the Y RACH occasions, wherein the preamble indicates exactly one of: (1) a feedback associated with a shared channel from the X shared channels, or (2) a random access.

19. The apparatus of claim 18, wherein in response to Y being greater than X, the Y RACH occasions are associated with X RACH occasion groups, and wherein each of the X RACH occasion groups is associated with one shared channel to be transmitted by the network device.

20. The apparatus of claim 18, wherein in response to Y being greater than X, the Y RACH occasions are associated with X RACH occasion groups, and wherein the X RACH occasion groups are from the Y RACH occasions based on a predefined rule.

* * * * *